(12) United States Patent
Chikamoto

(10) Patent No.: US 10,933,633 B2
(45) Date of Patent: Mar. 2, 2021

(54) LIQUID EJECTING DEVICE AND EJECTION SELECTION SIGNAL GENERATION CIRCUIT

(71) Applicant: Seiko Epson Corporation, Tokyo (JP)

(72) Inventor: Motonori Chikamoto, Shiojiri (JP)

(73) Assignee: Seiko Epson Corporation

( * ) Notice: Subject to any disclaimer, the term of this patent is extended or adjusted under 35 U.S.C. 154(b) by 456 days.

(21) Appl. No.: 15/779,717

(22) PCT Filed: Nov. 25, 2016

(86) PCT No.: PCT/JP2016/084942
§ 371 (c)(1),
(2) Date: May 29, 2018

(87) PCT Pub. No.: WO2017/094610
PCT Pub. Date: Jun. 8, 2017

(65) Prior Publication Data
US 2020/0298562 A1    Sep. 24, 2020

(30) Foreign Application Priority Data
Nov. 30, 2015   (JP) .............................. JP2015-233894

(51) Int. Cl.
*B41J 2/045*    (2006.01)
(52) U.S. Cl.
CPC ....... *B41J 2/04588* (2013.01); *B41J 2/04541* (2013.01); *B41J 2/04581* (2013.01)
(58) Field of Classification Search
CPC .......................... B41J 2/04588; B41J 2/04541; B41J 2/04581; B41J 2/2139; B41J 2/14233; B41J 2/04593; B41J 2/04596; G06K 15/102
See application file for complete search history.

(56) References Cited

U.S. PATENT DOCUMENTS 6,270,180 B1    8/2001    Arakawa et al.
6,758,544 B2    7/2004    Fukano
(Continued)

FOREIGN PATENT DOCUMENTS

EP    1 563 997 A1    8/2005
EP    3031609 A1 *  6/2016    .......... B41J 2/04591
(Continued)

OTHER PUBLICATIONS

IP.com search (Year: 2020).*

*Primary Examiner* — Lisa Solomon
(74) *Attorney, Agent, or Firm* — Harness, Dickey & Pierce, P.L.C.

(57) ABSTRACT

A liquid ejecting device includes: an ejecting section group that includes a plurality of ejecting sections that can eject a liquid droplet having different sizes upon application of a drive signal, the plurality of ejecting sections including a first ejecting section and a second ejecting section; and an ejection selection section that selects an ejecting section to which the drive signal is applied from the ejecting section group in response to an ejection selection signal, the ejection selection signal including: a first ejecting section bit data group consisting of a plurality of pieces of first ejecting section control bit data including first ejecting section first control bit data and first ejecting section second control bit data that control the size of the liquid droplet to be ejected from the first ejecting section; and a second ejecting section bit data group consisting of a plurality of pieces of second ejecting section control bit data including second ejecting section first control bit data and second ejecting section second control bit data that control the size of the liquid droplet to be ejected from the second ejecting section, and the second ejecting section bit data group following the first ejecting section bit data group.

16 Claims, 16 Drawing Sheets

(56) References Cited

U.S. PATENT DOCUMENTS

| | | |
|---|---|---|
| 7,758,141 B2 | 7/2010 | Sakurai |
| 8,922,852 B2 | 12/2014 | Imai |
| 2005/0204365 A1 | 9/2005 | Imai |
| 2006/0023012 A1 | 2/2006 | Han |
| 2007/0008358 A1 | 1/2007 | Kobayashi |
| 2007/0296743 A1 | 12/2007 | Sakurai |

FOREIGN PATENT DOCUMENTS

| | | |
|---|---|---|
| JP | H11-138798 A | 5/1999 |
| JP | 2003-001824 A | 1/2003 |
| JP | 2008-023991 A | 2/2008 |
| JP | 4930622 B2 | 5/2012 |
| JP | 5031455 B2 | 9/2012 |

* cited by examiner

[Fig. 1]
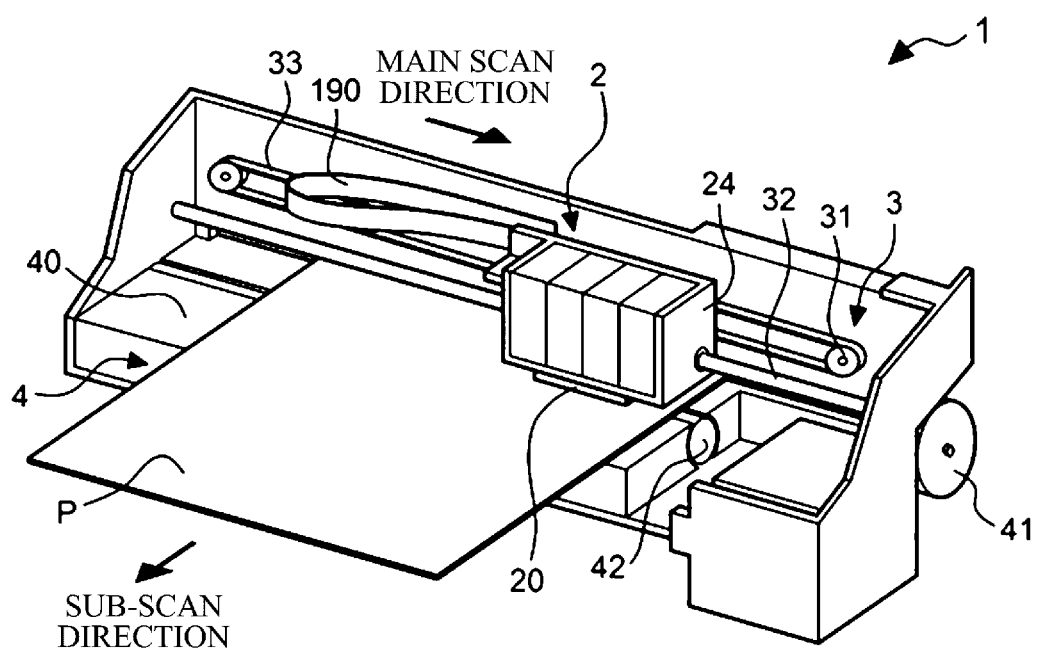

[Fig. 2]
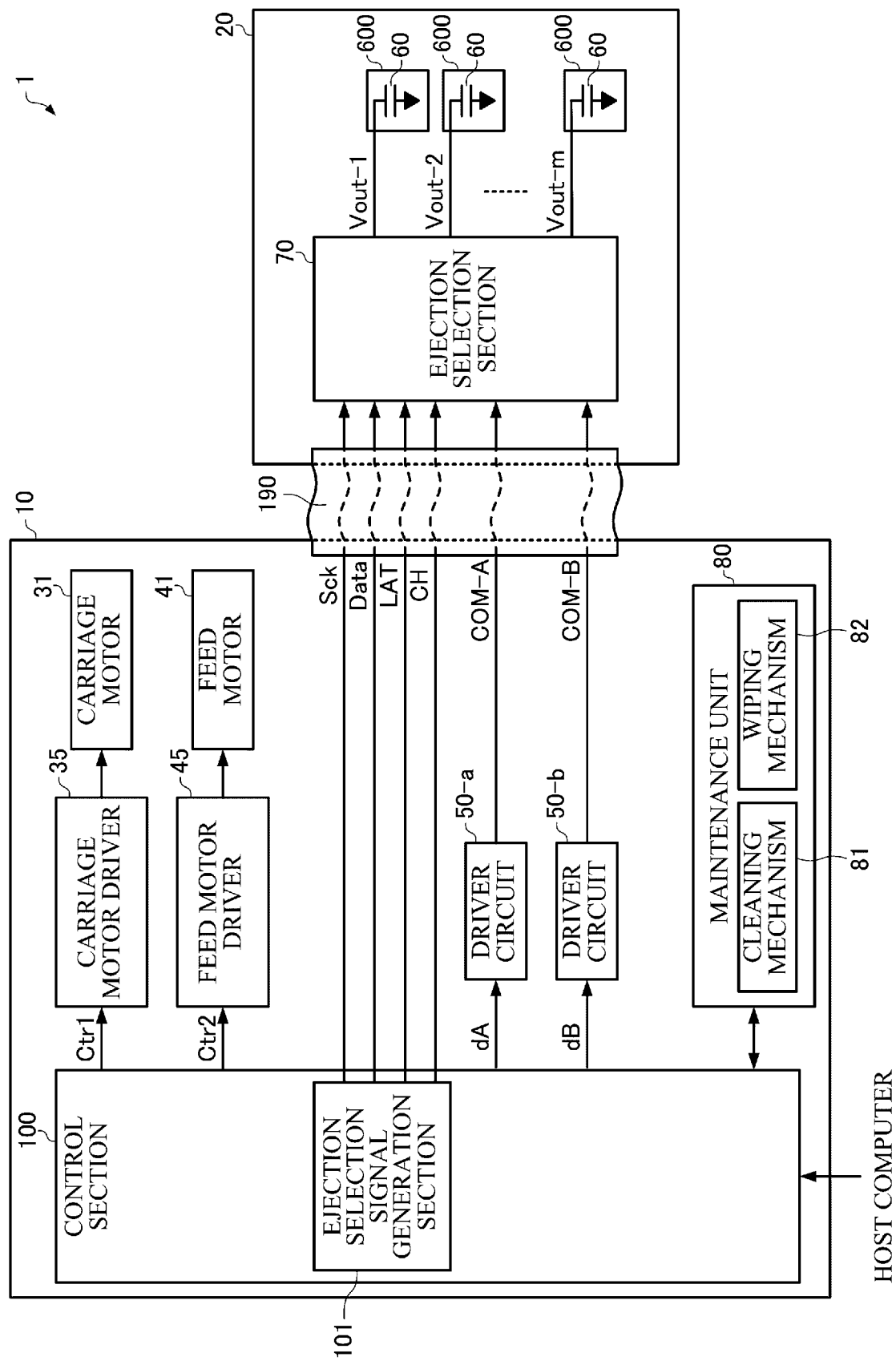

[Fig. 3]
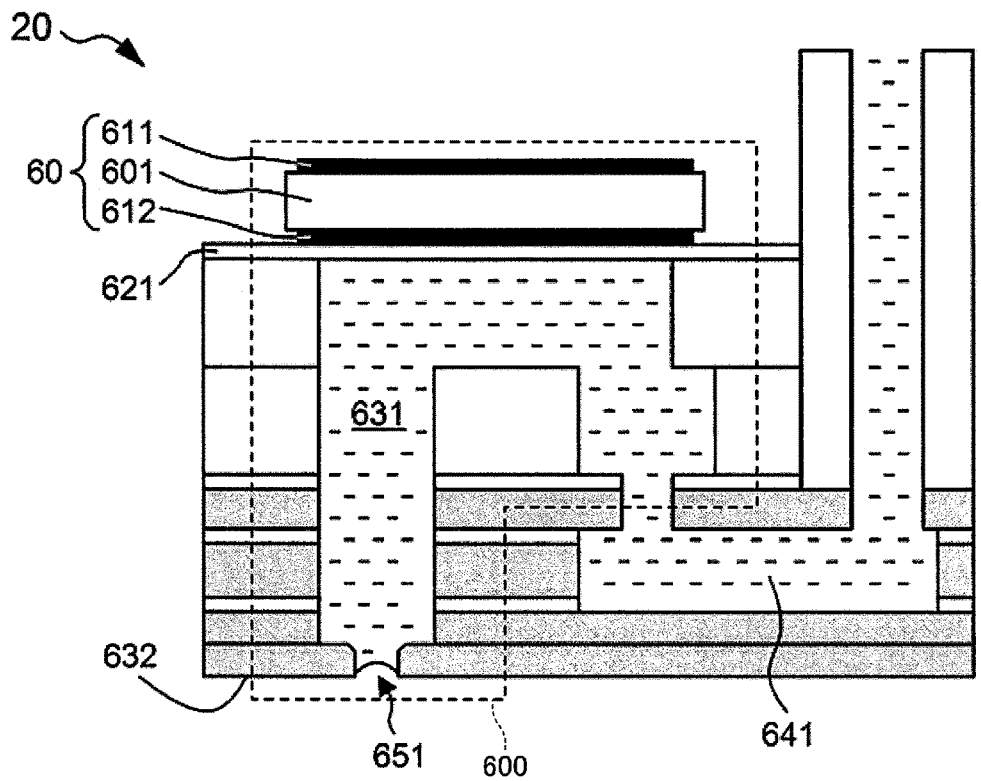
[Fig. 4A]
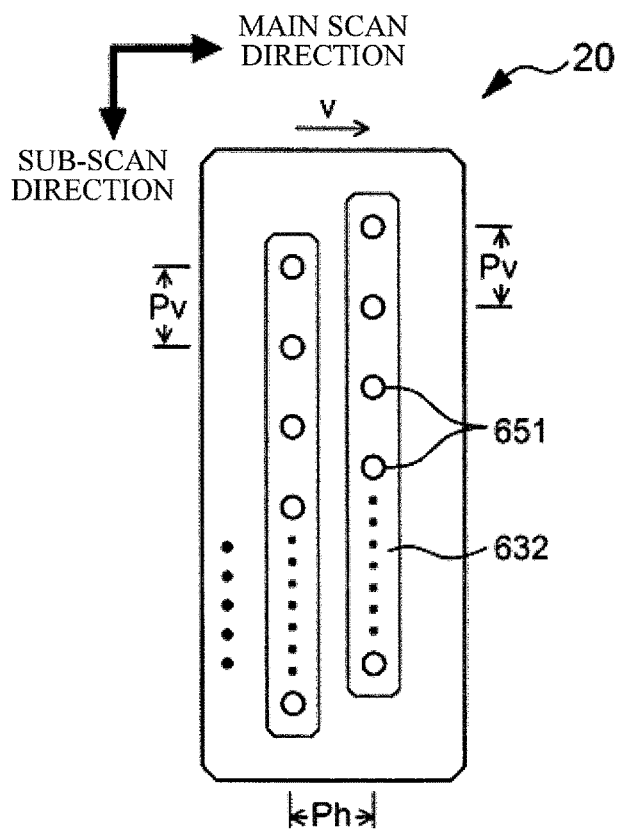

[Fig. 4B]
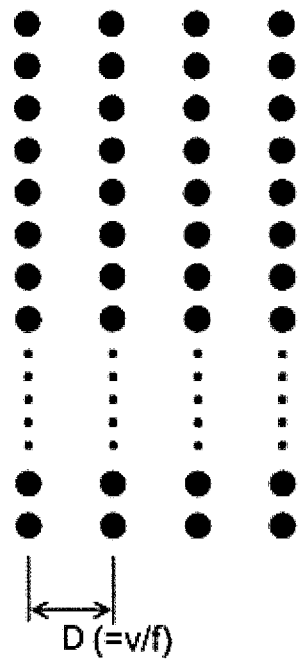
[Fig. 5]
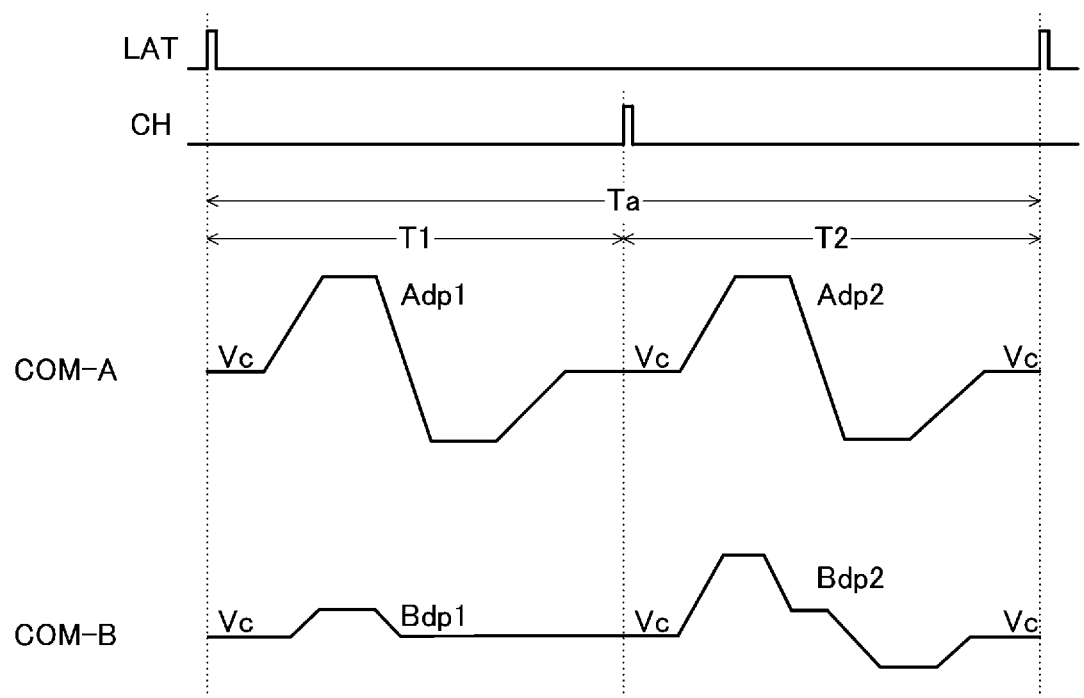

[Fig. 6]
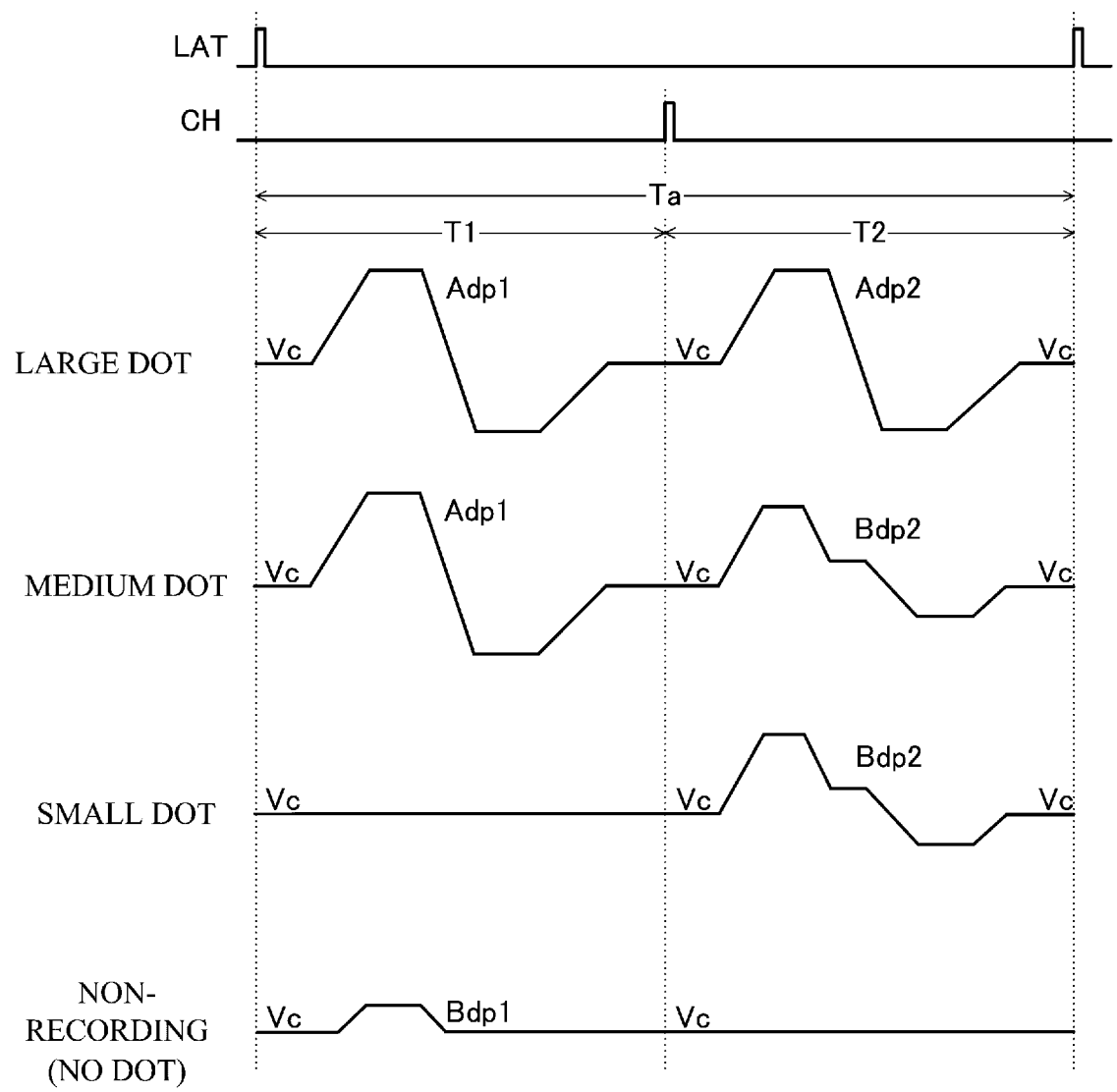

[Fig. 7]
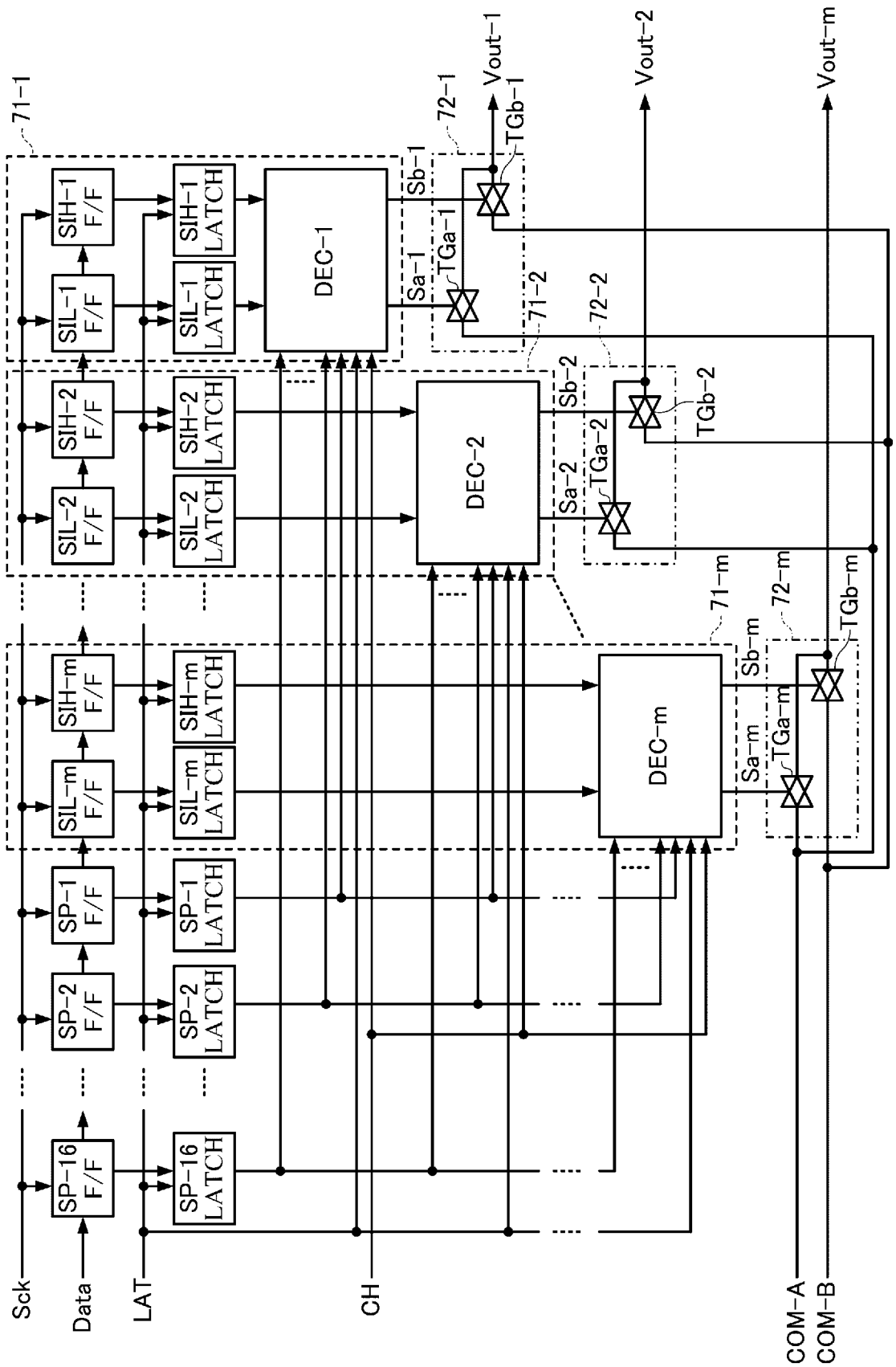

[Fig. 8]
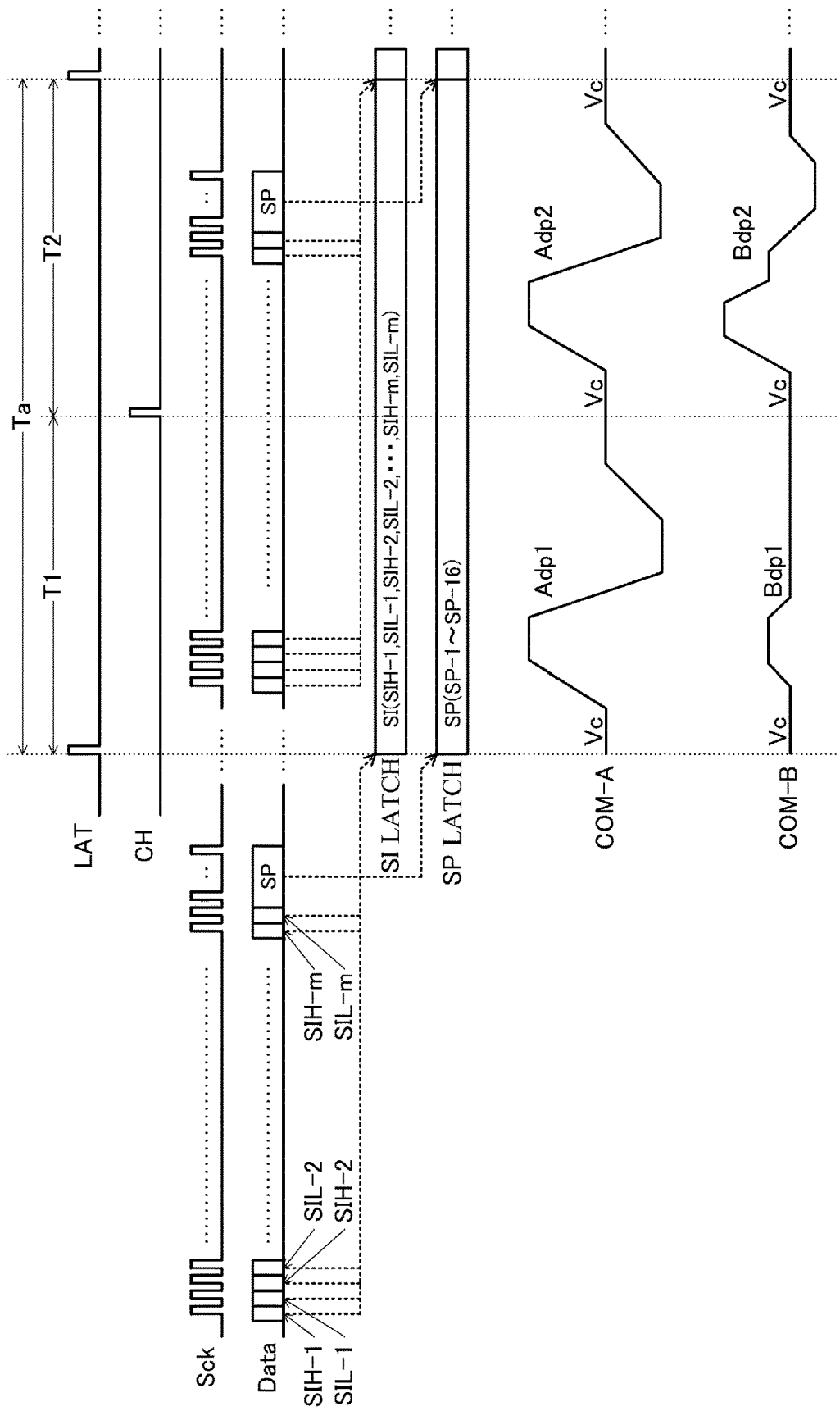

[Fig. 9]

| (SIH-i, SIL-i) | T1 | | T2 | | SP-1~SP-16 |
|---|---|---|---|---|---|
| | Sa-i | Sb-i | Sa-i | Sb-i | |
| (1, 1)[LARGE DOT] | H | L | H | L | SP-1~SP-4=(1, 0, 1, 0) |
| (1, 0)[MEDIUM DOT] | H | L | L | H | SP-5~SP-8=(1, 0, 0, 1) |
| (0, 1)[SMALL DOT] | L | L | L | H | SP-9~SP-12=(0, 0, 0, 1) |
| (0, 0)[NON-RECORDING] | L | H | L | L | SP-13~SP-16=(0, 1, 0, 0) |

[Fig. 10]
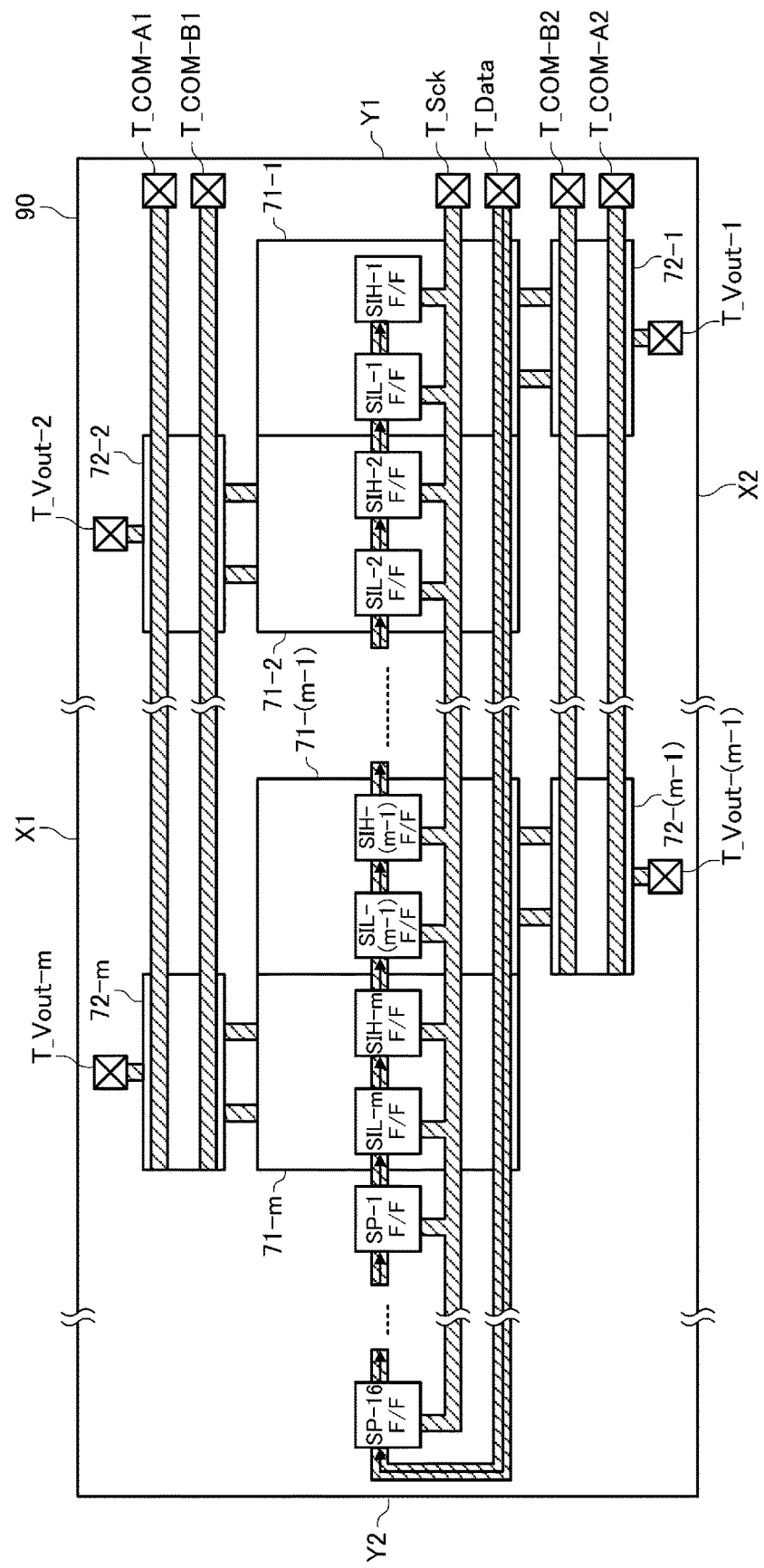

[Fig. 11]
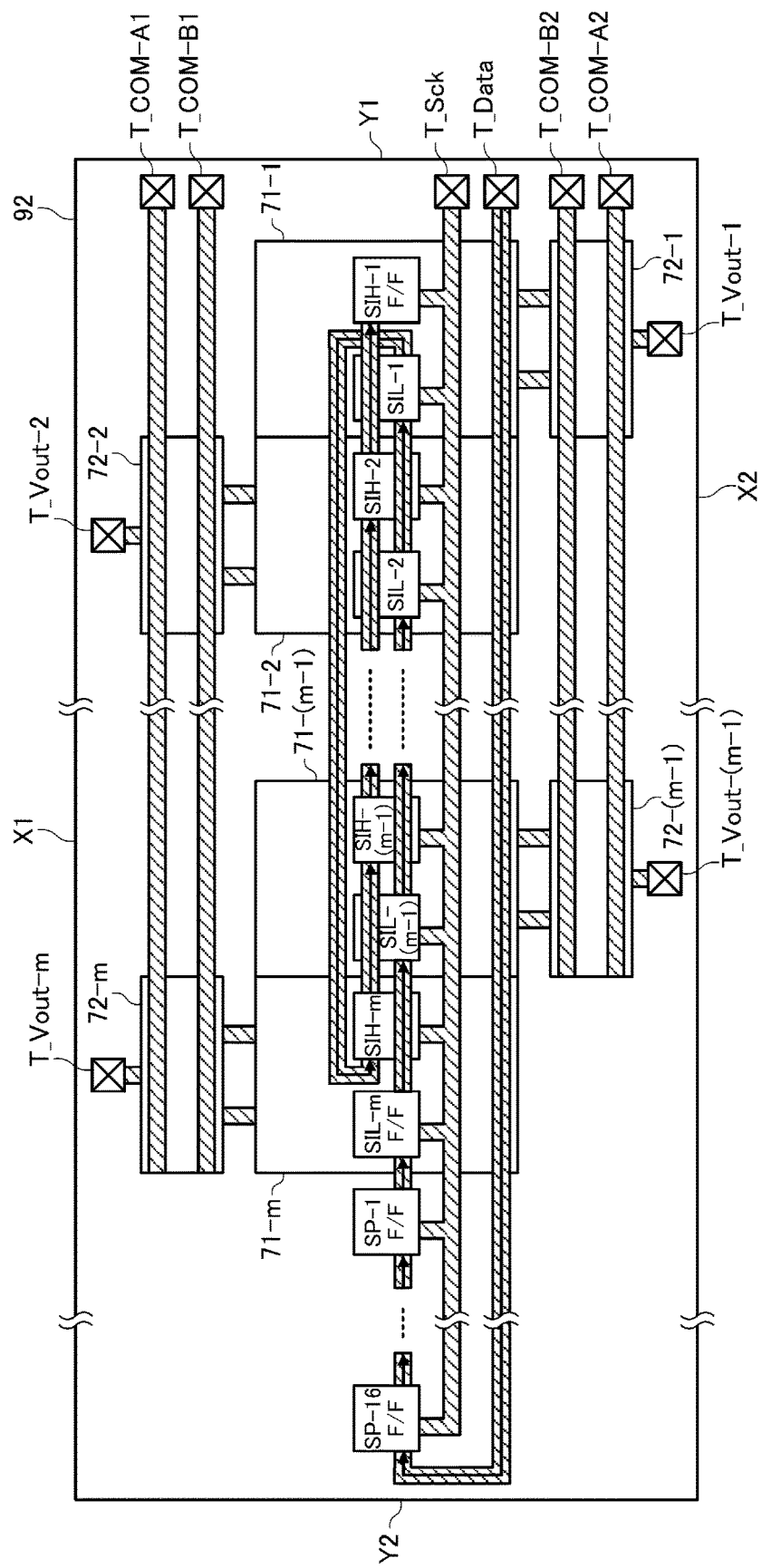

[Fig. 12]
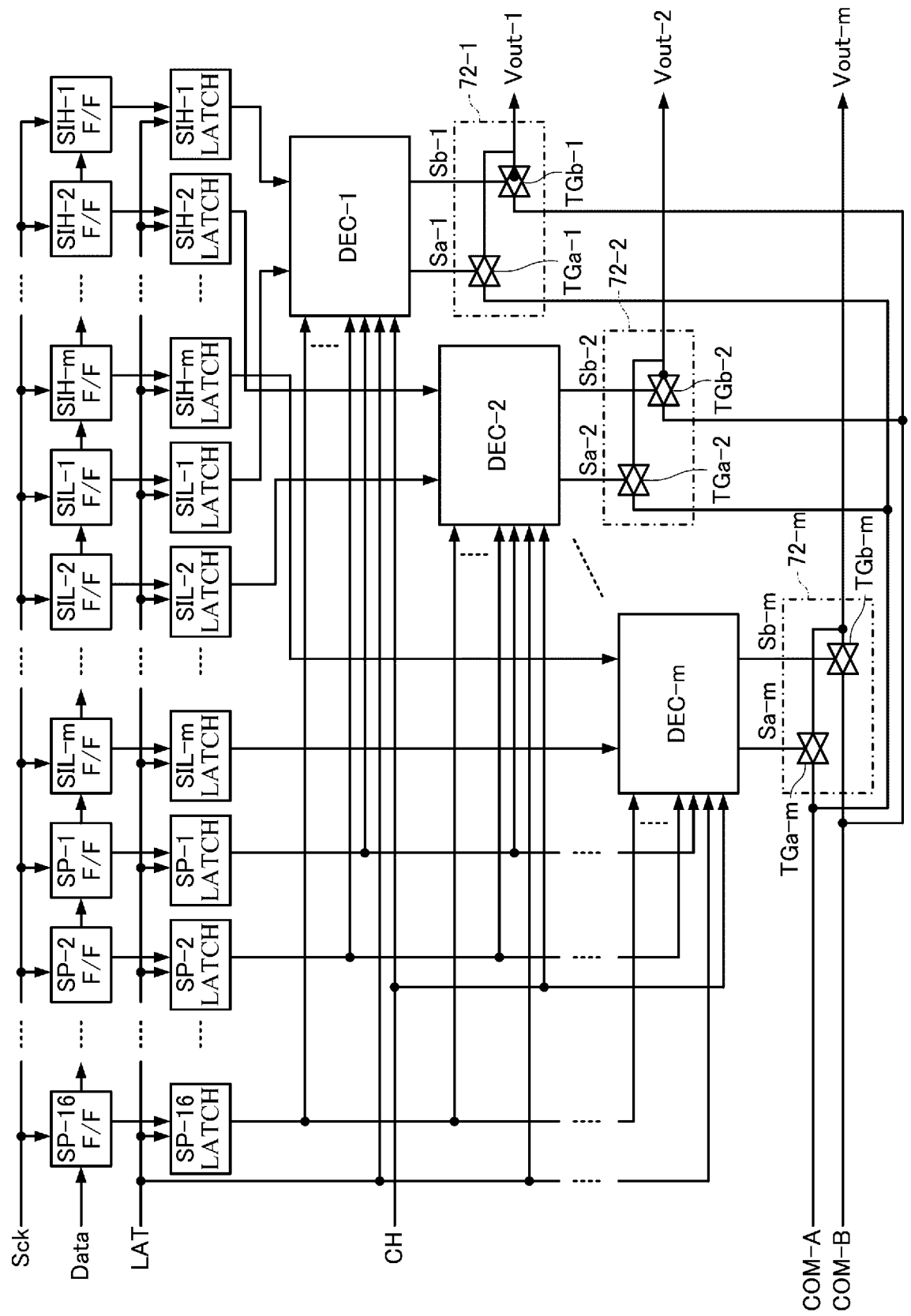

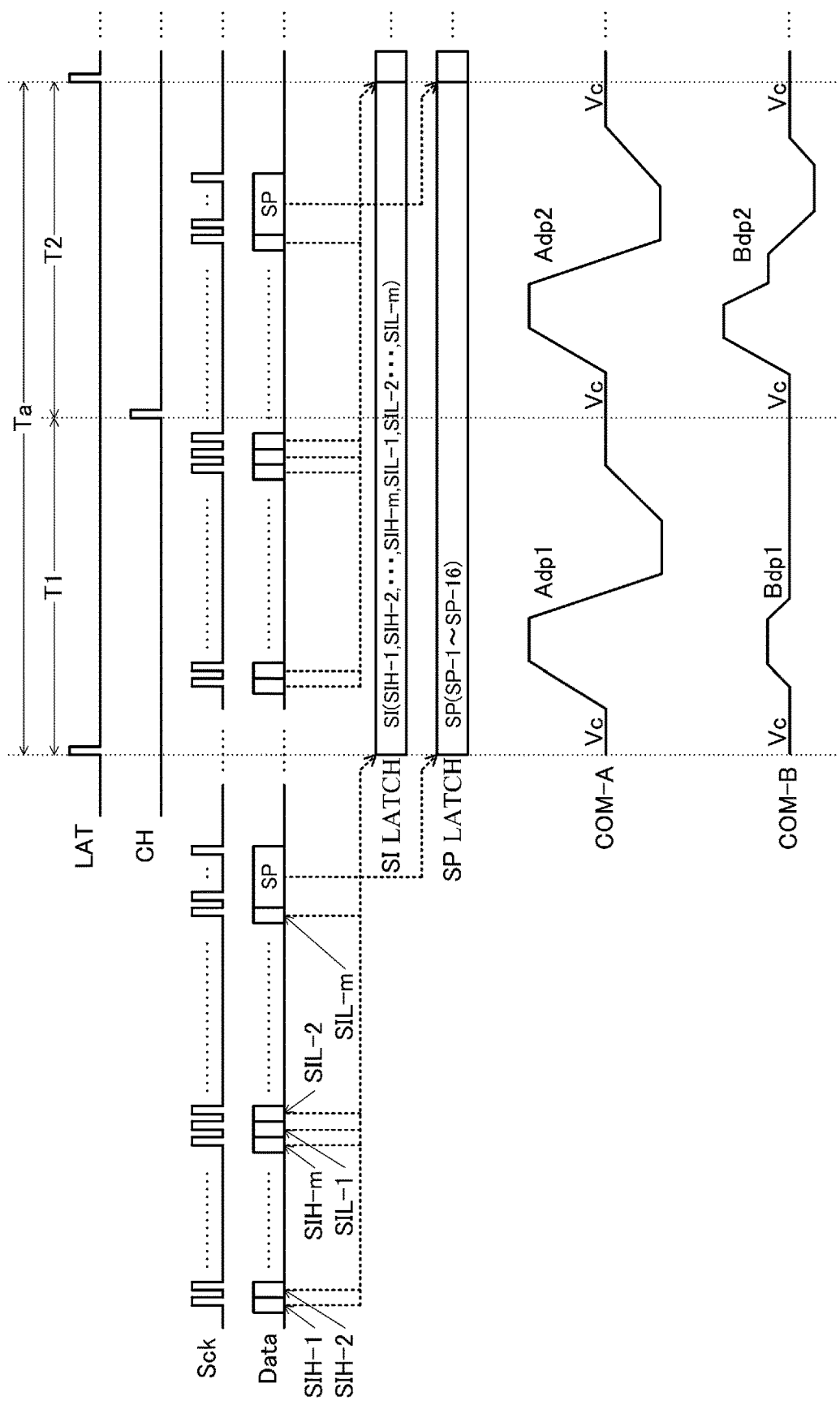
[Fig. 13]

[Fig. 14]
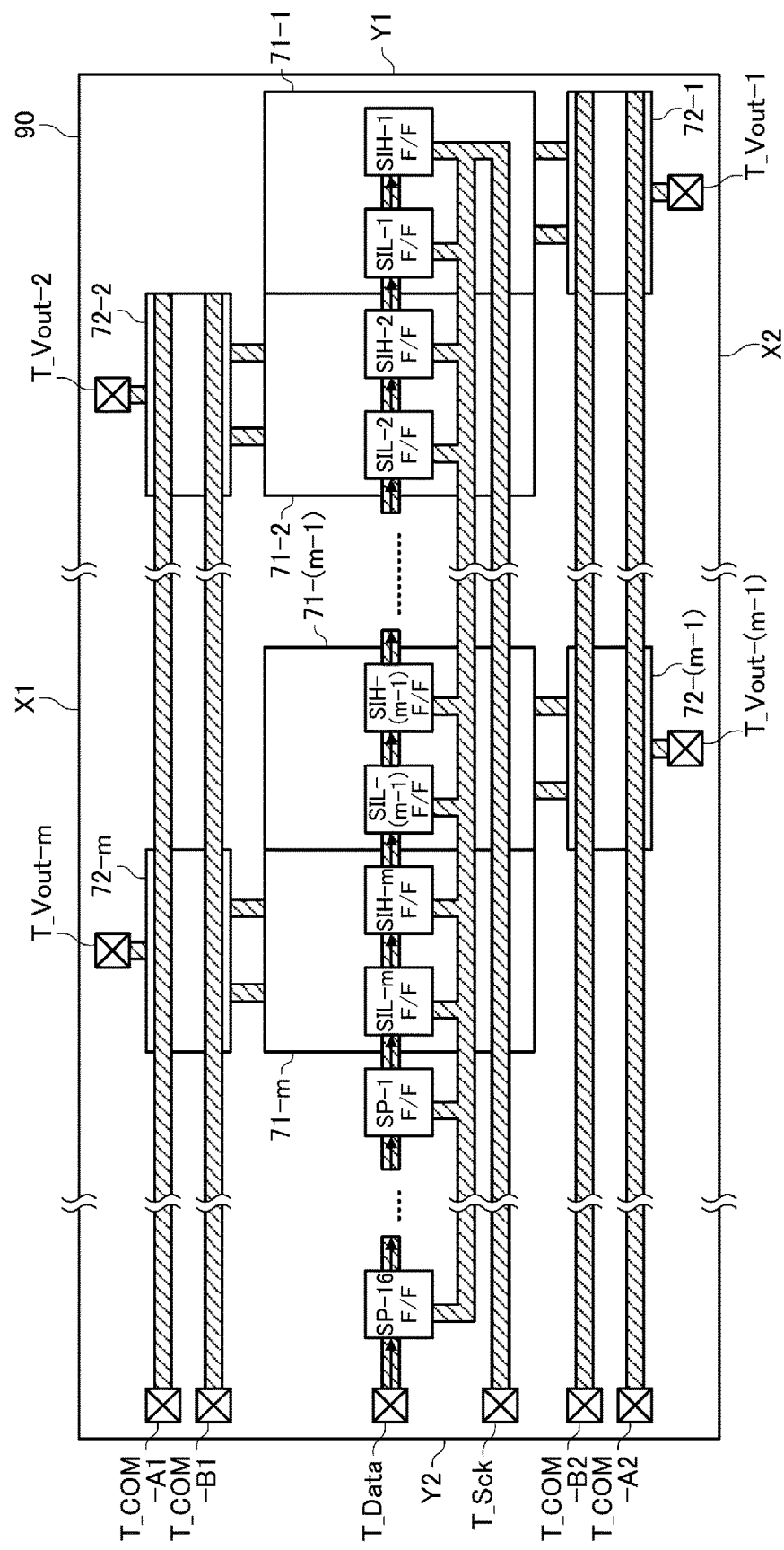

[Fig. 15]
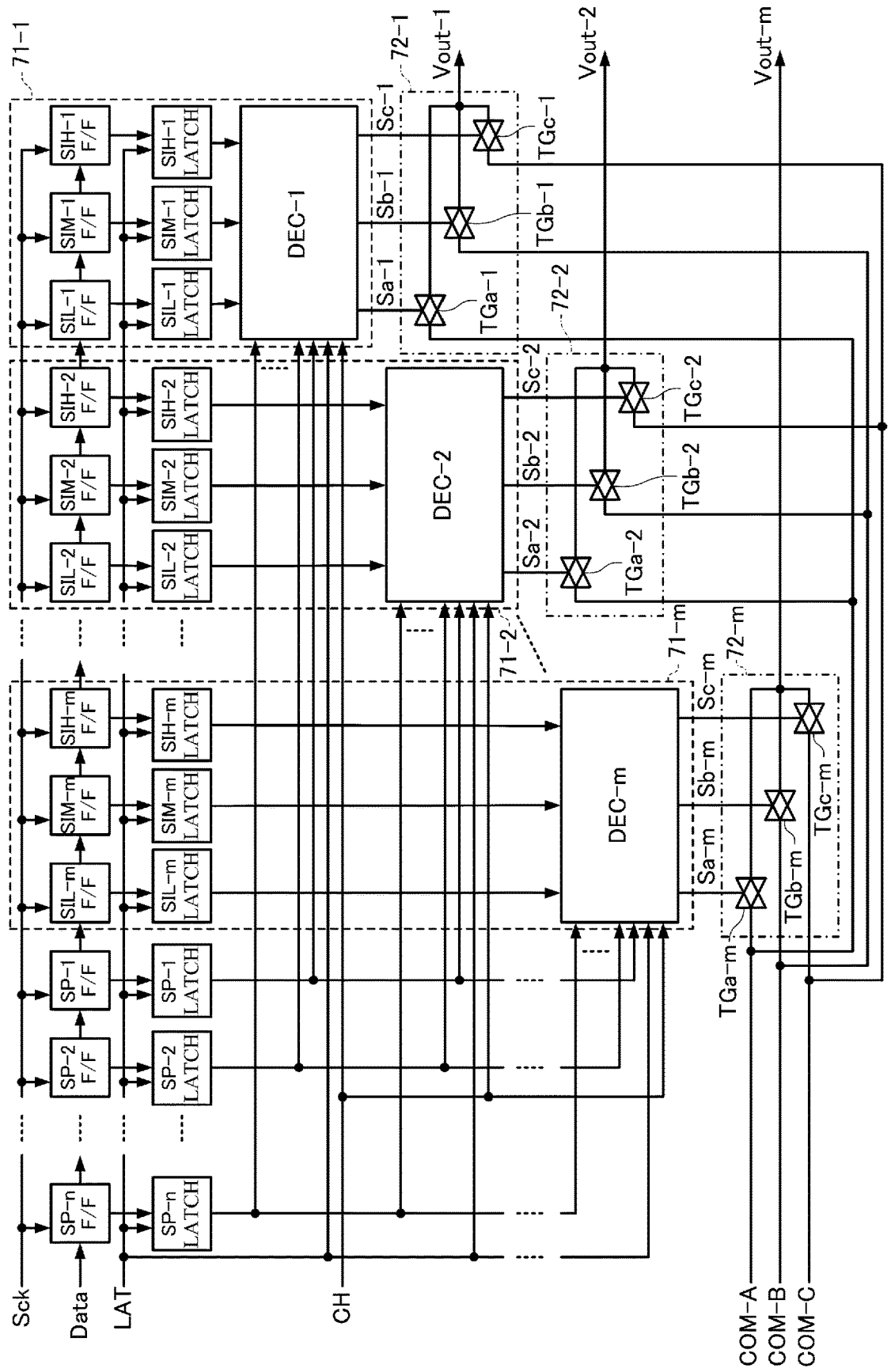

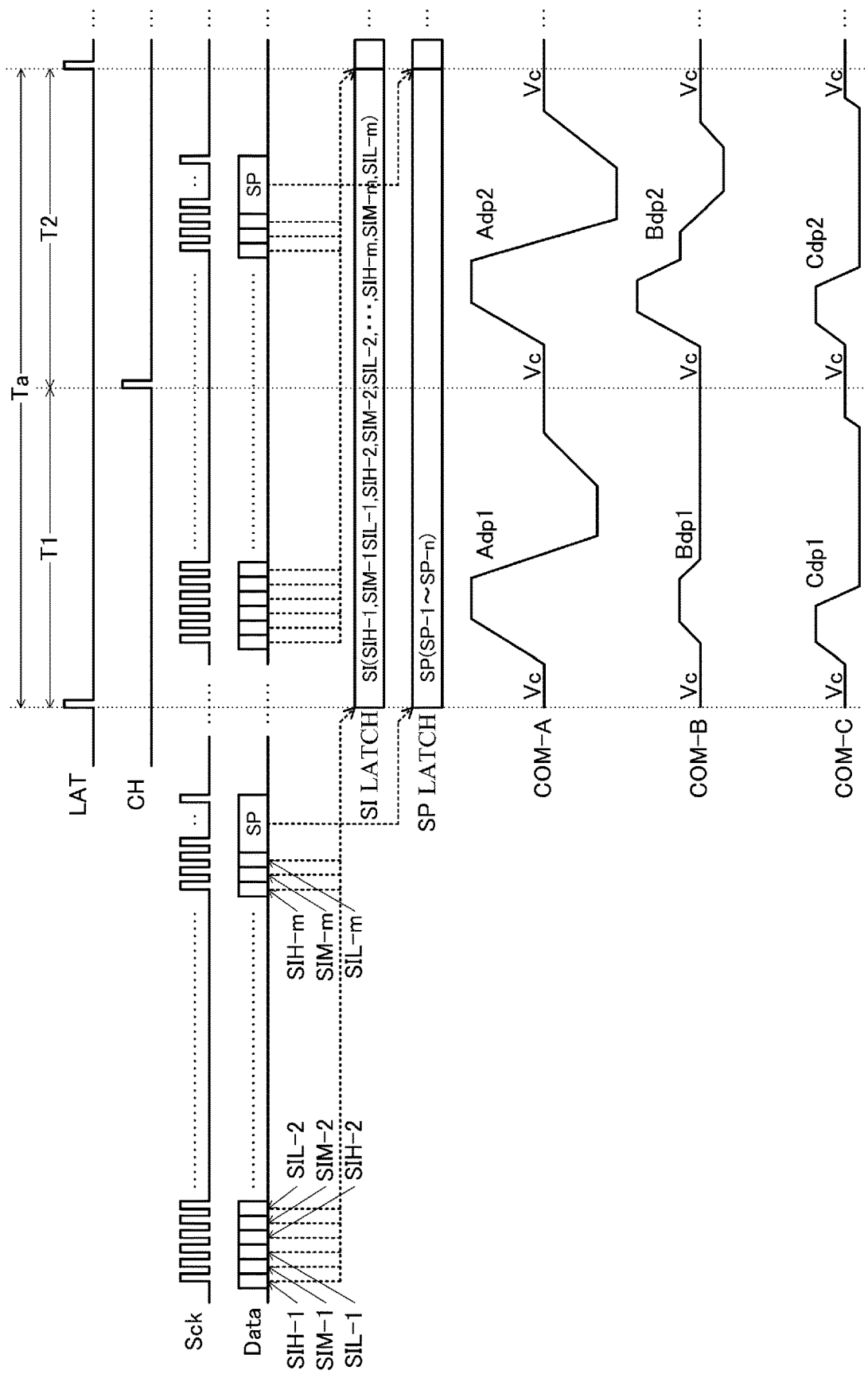
[Fig. 16]

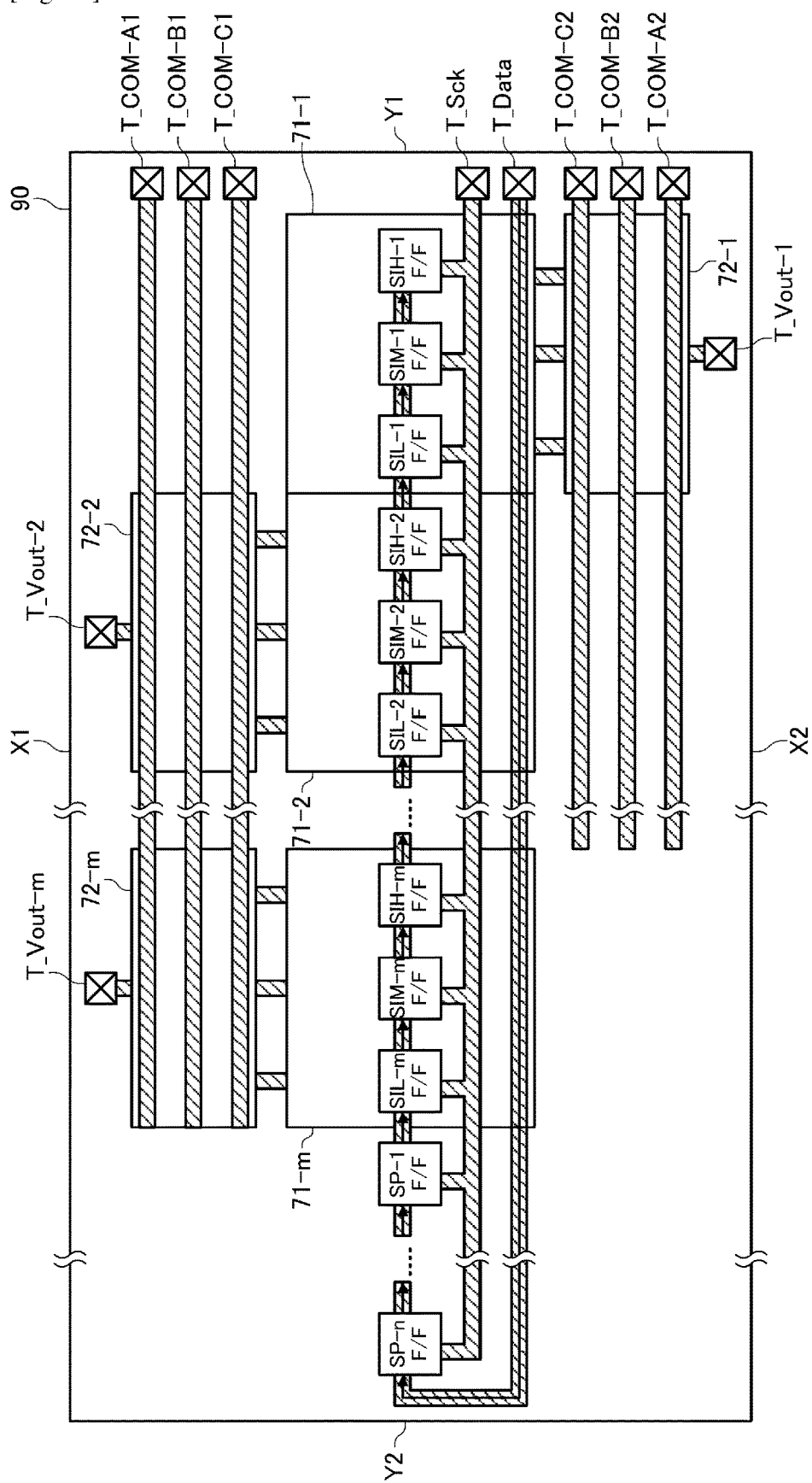
[Fig. 17]

LIQUID EJECTING DEVICE AND EJECTION SELECTION SIGNAL GENERATION CIRCUIT

TECHNICAL FIELD

The present invention relates to a liquid ejecting device and an ejection selection signal generation circuit.

BACKGROUND ART

A liquid ejecting device (e.g., inkjet printer) that ejects an ink to print an image or a document may be designed to utilize a piezoelectric element (piezo element). The piezoelectric element is provided to the head unit corresponding to each of a plurality of ejecting sections, and driven according to a drive signal so that a predetermined amount of ink (liquid) is ejected from each nozzle at a predetermined timing to form a dot on a medium (e.g., paper).

Patent Literature 1 discloses an inkjet printer that is configured so that each of a plurality of ejecting sections can eject an ink in an amount corresponding to one of four grayscales ("non-recording", "small dot", "medium dot", and "large dot") by controlling each ejecting section using 2-bit control data. The inkjet printer disclosed in Patent Literature 1 thus implements high-quality printing.

CITATION LIST

Patent Literature

PTL 1: Japanese Patent No. 04930622

SUMMARY OF INVENTION

Technical Problem

In recent years, high-speed, high-quality printing has been increasingly desired, and the density of ejecting sections provided to a liquid ejecting device (e.g., inkjet printer) has been increased in order to meet such a demand. It is necessary to increase the density of circuits that control the ejecting sections while achieving optimization along with an increase in the density of ejecting sections.

The inkjet printer disclosed in Patent Literature 1 is configured so that the control section collectively transmits higher-order bits of the control data that respectively controls a plurality of ejecting sections to the driver circuit system, and then collectively transmits lower-order bits of the control data. Since the driver circuit system transfers the control data using a shift register (that includes a plurality of flip-flops connected in series), the length of a line increases as the number of ejecting sections increases, the line connecting the output terminal of the flip-flop that holds the higher-order bit data (that is transmitted last) and the input terminal of the flip-flop that holds the lower-order bit data (that is transmitted first). In this case, since the load applied to the line increases, a shift in data transfer timing easily occurs, whereby erroneous ejection tends to occur.

The invention was conceived in view of the above problems. Several aspects of the invention may provide a liquid ejecting device that can reduce the possibility that erroneous ejection occurs, and produce a high-quality product. Several aspects of the invention may provide an ejection selection signal generation circuit that can reduce the possibility that erroneous ejection occurs when used for a head unit.

Solution to Problem

The invention was conceived in order to solve at least some of the above problems, and may be implemented as described below (see the following aspects and application examples).

APPLICATION EXAMPLE 1

According to one aspect of the invention, a liquid ejecting device includes:

an ejecting section group that includes a plurality of ejecting sections that can eject a liquid droplet having different sizes upon application of a drive signal, the plurality of ejecting sections including a first ejecting section and a second ejecting section; and an ejection selection section that selects an ejecting section to which the drive signal is applied from the ejecting section group in response to an ejection selection signal, the ejection selection signal including:

a first ejecting section bit data group consisting of a plurality of pieces of first ejecting section control bit data including first ejecting section first control bit data and first ejecting section second control bit data that control the size of the liquid droplet to be ejected from the first ejecting section; and a second ejecting section bit data group consisting of a plurality of pieces of second ejecting section control bit data including second ejecting section first control bit data and second ejecting section second control bit data that control the size of the liquid droplet to be ejected from the second ejecting section, and the second ejecting section bit data group following the first ejecting section bit data group.

Note that the expressions "liquid droplet having a different size" and "can eject a liquid droplet having a different size" used herein include a case where a liquid droplet is not ejected.

Since the liquid ejecting device is configured so that each of the plurality of ejecting sections included in the ejecting section group can eject a liquid droplet having a different size, the control data included in the ejection selection signal has a large size. Specifically, it is necessary to provide the first ejecting section bit data group that includes at least 2 bits of data and includes the first ejecting section first control bit data and the first ejecting section second control bit data in order to control the size of a liquid droplet that is ejected from the first ejecting section, and provide the second ejecting section bit data group that includes at least 2 bits of data and includes the second ejecting section first control bit data and the second ejecting section second control bit data in order to control the size of a liquid droplet that is ejected from the second ejecting section.

If the ejection selection section receives a plurality of pieces of first control bit data including the first ejecting section first control bit data and the second ejecting section first control bit data, and then receives a plurality of pieces of second control bit data including the first ejecting section second control bit data and the second ejecting section second control bit data, the order with regard to the physical position of a storage section at which each control bit data is stored, may be consistent with the order in which the ejection selection section receives each control bit data. Since the size of the control bit data included in the ejection selection signal is large, it is likely that the length of the path (line) through which the ejection selection signal propagates increases, and a shift in timing occurs.

According to the liquid ejecting device, however, since the ejection selection signal includes the first ejecting section bit data group and the second ejecting section bit data group that follows the first ejecting section bit data group, the ejection selection section receives the first ejecting section bit data group that controls the size of a liquid droplet that is ejected from the first ejecting section, and then receives the second ejecting section bit data group that controls the size of a liquid droplet that is ejected from the second ejecting section. Therefore, the liquid ejecting device ensures that the order with regard to the physical position of a storage section at which each control bit data is stored, is easily consistent with the order in which the ejection selection section receives each control bit data, and makes it possible to easily reduce the length of the path (line) through which the ejection selection signal propagates. Therefore, the liquid ejecting device can reduce the possibility that a shift in timing occurs when the ejection selection section transfers the ejection selection signal, reduce the possibility that erroneous ejection occurs, and produce a high-quality product.

APPLICATION EXAMPLE 2

In the liquid ejecting device, the ejection selection section may be an integrated circuit, the integrated circuit may have a long side and a short side in a plan view, the ejection selection signal may be input through a terminal that is provided to the short side of the integrated circuit, and the drive signal may be output through a plurality of terminals that are provided to the long side of the integrated circuit.

According to this configuration, the integrated circuit can be designed so that the placement area of a line through which the ejection selection signal propagates is efficiently separated from the placement area of a line through which the drive signal that is higher in voltage than the ejection selection signal propagates. Therefore, the liquid ejecting device can reduce the effect of noise on the ejection selection signal due to the drive signal while controlling an increase in the size of the integrated circuit, reduce the possibility that erroneous ejection occurs, and produce a high-quality product.

APPLICATION EXAMPLE 3

In the liquid ejecting device, the ejection selection section may include: a plurality of waveform selection signal generation circuits that generate waveform selection signals in response to the ejection selection signal; and a plurality of drive signal selection circuits that select a waveform included in the drive signal in response to the waveform selection signal, and apply the selected waveform to the ejecting section, and the plurality of waveform selection signal generation circuits may be arranged in a direction along the long side of the integrated circuit in a plan view.

According to this configuration, the integrated circuit can be designed so that the placement area of a plurality of waveform selection signal generation circuits that operate based on the ejection selection signal is efficiently separated from the placement area of a plurality of drive signal selection circuits that operate at a high voltage in order to generate the drive signal. Therefore, the liquid ejecting device can reduce the effect of noise on a plurality of waveform selection signal generation circuits due to the operation of a plurality of drive signal selection circuits while controlling an increase in the size of the integrated circuit, reduce the possibility that erroneous ejection occurs, and produce a high-quality product.

APPLICATION EXAMPLE 4

In the liquid ejecting device, the ejection selection signal may be sequentially transferred to the plurality of waveform selection signal generation circuits by means of a clock signal, and the clock signal may be input through a terminal that is provided to the short side of the integrated circuit in a plan view.

According to this configuration, the integrated circuit can be designed so that the placement area of a line through which the clock signal propagates and a plurality of waveform selection signal generation circuits that transfer the ejection selection signal by means of the clock signal, is efficiently separated from the placement area of a line through which the drive signal propagates and a plurality of drive signal selection circuits. Therefore, the liquid ejecting device can reduce the possibility that a shift in timing occurs when a plurality of waveform selection signal generation circuits transfer data due the effect of noise caused by the drive signal or the operation of a plurality of drive signal selection circuits while controlling an increase in the size of the integrated circuit, reduce the possibility that erroneous ejection occurs, and produce a high-quality product.

APPLICATION EXAMPLE 5

In the liquid ejecting device, the clock signal may be input first to a waveform selection signal generation circuit among the plurality of waveform selection signal generation circuits that is situated closest to the short side where the clock signal is input, and the ejection selection signal may be finally input to a waveform selection signal generation circuit among the plurality of waveform selection signal generation circuits that is situated closest to the short side where the clock signal is input.

According to this configuration, since the clock signal is sequentially input to two arbitrary waveform selection signal generation circuits (between which the ejection selection signal is transferred) so that the clock signal is input to one of the two arbitrary waveform selection signal generation circuits that transfers the ejection selection signal after the clock signal has been input to the other of the two arbitrary waveform selection signal generation circuits to which the ejection selection signal is transferred, it is possible to reduce the possibility that a shift in timing occurs when the ejection selection signal is transferred. This makes it possible to reduce the possibility that erroneous ejection occurs, and produce a high-quality product.

APPLICATION EXAMPLE 6

In the liquid ejecting device, the ejection selection signal may be input first to a waveform selection signal generation circuit among the plurality of waveform selection signal generation circuits that is situated closest to the short side where the clock signal is input, and the clock signal may be finally input to a waveform selection signal generation circuit among the plurality of waveform selection signal generation circuits that is situated closest to the short side where the clock signal is input.

According to this configuration, since the clock signal is sequentially input to two arbitrary waveform selection signal generation circuits (between which the ejection selection signal is transferred) so that the clock signal is input to one of the two arbitrary waveform selection signal generation circuits that transfers the ejection selection signal after the clock signal has been input to the other of the two arbitrary waveform selection signal generation circuits to which the ejection selection signal is transferred, it is possible to reduce the possibility that a shift in timing occurs when the ejection selection signal is transferred. This makes it possible to reduce the possibility that erroneous ejection occurs, and produce a high-quality product.

APPLICATION EXAMPLE 7

In the liquid ejecting device, the ejection selection section may include: a first data-holding section that holds the first ejecting section bit data group; and a second data-holding section that is provided in a preceding stage of the first data-holding section, and holds the second ejecting section bit data group, and the ejection selection signal may be input to the second data-holding section, and then input to the first data-holding section.

According to this configuration, it is possible to ensure that the order with regard to the physical positions of a plurality of data-holding sections including the first data-holding section that holds the first ejecting section bit data group and the second data-holding section that holds the second ejecting section bit data group, is easily consistent with the order in which the ejection selection section receives each control bit data, and easily reduce the length of the path (line) through which the ejection selection signal propagates. Therefore, the liquid ejecting device can reduce the possibility that a shift in timing occurs when the ejection selection section transfers the ejection selection signal, reduce the possibility that erroneous ejection occurs, and produce high-quality printed matter (product).

APPLICATION EXAMPLE 8

In the liquid ejecting device, the plurality of waveform selection signal generation circuits may include: a first waveform selection signal generation circuit that generates a first waveform selection signal among the waveform selection signals for generating the drive signal that is applied to the first ejecting section; and a second waveform selection signal generation circuit that generates a second waveform selection signal among the waveform selection signals for generating the drive signal that is applied to the second ejecting section, the first waveform selection signal generation circuit may include the first data-holding section, and generate the first waveform selection signal based on the first ejecting section bit data group that is held by the first data-holding section, and the second waveform selection signal generation circuit may include the second data-holding section, and generate the second waveform selection signal based on the second ejecting section bit data group that is held by the second data-holding section.

According to this configuration, it is possible to ensure that the order with regard to the physical positions of a plurality of waveform selection signal generation circuits including the first waveform selection signal generation circuit that includes the first data-holding section and the second waveform selection signal generation circuit that includes the second data-holding section, is easily consistent with the order in which the ejection selection section receives a plurality of ejecting section bit data groups including the first ejecting section bit data group and the second ejecting section bit data group, and easily reduce the length of the path (line) through which the ejection selection signal propagates. Therefore, the liquid ejecting device can reduce the possibility that a shift in timing occurs when the ejection selection section transfers the ejection selection signal, reduce the possibility that erroneous ejection occurs, and produce high-quality printed matter (product).

APPLICATION EXAMPLE 9

According to another aspect of the invention, an ejection selection signal generation circuit generates an ejection selection signal that controls a head unit, the head unit including an ejecting section group that includes a plurality of ejecting sections that can eject a liquid droplet having different sizes upon application of a drive signal, and include a first ejecting section and a second ejecting section, and the head unit also including an ejection selection section that selects an ejecting section to which the drive signal is applied from the ejecting section group, the generated ejection selection signal including: a first ejecting section bit data group consisting of a plurality of pieces of first ejecting section control bit data including first ejecting section first control bit data and first ejecting section second control bit data that control the size of the liquid droplet to be ejected from the first ejecting section, and a second ejecting section bit data group consisting of a plurality of pieces of second ejecting section control bit data including second ejecting section first control bit data and second ejecting section second control bit data that control the size of the liquid droplet to be ejected from the second ejecting section, and the second ejecting section bit data group following the first ejecting section bit data group.

The ejection selection signal generation circuit generates the ejection selection signal so that the second ejecting section bit data group follows the first ejecting section bit data group. Therefore, the ejection selection section receives the first ejecting section bit data group that controls the size of a liquid droplet that is ejected from the first ejecting section, and then receives the second ejecting section bit data group that controls the size of a liquid droplet that is ejected from the second ejecting section. Therefore, when the ejection selection signal generation circuit is applied to the head unit, the order with regard to the physical position of a storage section at which each control bit data is stored, is easily consistent with the order in which the ejection selection section receives each control bit data, and it is possible to easily reduce the length of the path (line) through which the ejection selection signal propagates. Therefore, it is possible to reduce the possibility that a shift in timing occurs when the ejection selection section transfers the ejection selection signal, and reduce the possibility that erroneous ejection from the head unit occurs.

BRIEF DESCRIPTION OF DRAWINGS

FIG. 1 illustrates a schematic configuration of a liquid ejecting device.

FIG. 2 is a block diagram illustrating the configuration of a liquid ejecting device.

FIG. 3 illustrates the configuration of an ejecting section included in a head unit.

FIG. 4A illustrates the nozzle arrangement of a head unit.

FIG. 4B illustrates the basic resolution when forming an image using the nozzle arrangement illustrated in FIG. 4A.

FIG. 5 illustrates the waveforms of drive signals COM-A and COM-B.

FIG. 6 illustrates the waveform of a drive signal Vout.

FIG. 7 illustrates the functional configuration of an ejection selection section.

FIG. 8 illustrates the waveform of each signal supplied to an ejection selection section, and the update timing of each latch.

FIG. 9 is a table illustrating a decoding logic applied to a decoder.

FIG. 10 illustrates the layout of an IC that implements an ejection selection section according to one embodiment of the invention.

FIG. 11 illustrates the layout of an IC that implements an ejection selection section according to a comparative example.

FIG. 12 illustrates the functional configuration of an ejection selection section according to a comparative example.

FIG. 13 illustrates the waveform of each signal supplied to an ejection selection section according to a comparative example.

FIG. 14 illustrates another layout of an IC that implements an ejection selection section according to one embodiment of the invention.

FIG. 15 illustrates the functional configuration of an ejection selection section according to the first modification.

FIG. 16 illustrates the waveform of each signal supplied to an ejection selection section, and the update timing of each latch according to the first modification.

FIG. 17 illustrates the layout of an IC that implements an ejection selection section according to the first modification.

DESCRIPTION OF EMBODIMENTS

The exemplary embodiments of the invention are described in detail below with reference to the drawings. Note that the drawings are used for convenience of explanation. The following exemplary embodiments do not unduly limit the scope of the invention as stated in the claims. All of the elements described below should not necessarily be taken as essential elements of the invention.

1. Outline of Liquid Ejecting Device

A printer (i.e., liquid ejecting device) according to one embodiment of the invention is an inkjet printer that forms ink dots on a print medium (e.g., paper) by ejecting an ink corresponding to image data supplied from an external host computer to print an image (including a character, a figure, and the like) corresponding to the image data.

Examples of the liquid ejecting device include a printing device such as a printer, a color material ejecting device that is used to produce a color filter used for a liquid crystal display and the like, an electrode material ejecting device that is used to form an electrode of an organic EL display, a field emission display (FED), and the like, a biological organic substance ejecting device that is used to produce a biochip, and the like.

FIG. 1 is a perspective view illustrating a schematic internal configuration of a liquid ejecting device 1. As illustrated in FIG. 1, the liquid ejecting device 1 includes a moving mechanism 3 that moves (reciprocates) a moving element 2 in the main scan direction.

The moving mechanism 3 includes a carriage motor 31 that moves the moving element 2, a carriage guide shaft 32 that is secured at each end, and a timing belt 33 that extends almost parallel to the carriage guide shaft 32, and is driven by the carriage motor 31.

A carriage 24 of the moving element 2 is reciprocally supported by the carriage guide shaft 32, and is secured on part of the timing belt 33. Therefore, when the timing belt 33 is moved forward and backward using the carriage motor 31, the moving element 2 reciprocates while being guided by the carriage guide shaft 32.

A head unit 20 is provided to an area of the moving element 2 that is situated opposite to a print medium P. The head unit 20 ejects an ink droplet (liquid droplet) from a number of nozzles (as described later). Various control signals and the like are supplied to the head unit 20 through a flexible cable 190.

The liquid ejecting device 1 includes a feed mechanism 4 that feeds the print medium P on a platen 40 in the sub-scan direction. The feed mechanism 4 includes a feed motor 41 (i.e., drive source), and a feed roller 42 that is rotated by the feed motor 41, and feeds the print medium P in the sub-scan direction.

The head unit 20 ejects an ink droplet toward the print medium P at a timing at which the print medium P has been fed by the feed mechanism 4 to form an image on the surface of the print medium P.

2. Electrical Configuration of Liquid Ejecting Device

FIG. 2 is a block diagram illustrating the electrical configuration of the liquid ejecting device 1.

As illustrated in FIG. 2, the liquid ejecting device 1 has a configuration in which a control unit 10 and the head unit 20 are connected through the flexible cable 190.

The control unit 10 includes a control section 100, the carriage motor 31, a carriage motor driver 35, the feed motor 41, a feed motor driver 45, a driver circuit 50-$a$, a driver circuit 50-$b$, and a maintenance unit 80. The control section 100 outputs various control signals and the like that control each section when the image data has been supplied from the host computer.

More specifically, the control section 100 supplies a control signal Ctrl to the carriage motor driver 35, and the carriage motor driver 35 drives the carriage motor 31 according to the control signal Ctrl. The movement of the carriage 24 in the main scan direction is thus controlled.

The control section 100 supplies a control signal Ctr2 to the feed motor driver 45, and the feed motor driver 45 drives the feed motor 41 according to the control signal Ctr2. The movement of the feed mechanism 4 in the sub-scan direction is thus controlled.

The control section 100 supplies digital data dA to the driver circuit 50-$a$, and supplies digital data dB to the driver circuit 50-$b$. The data dA represents (defines) the waveform of a drive signal COM-A that is supplied to the head unit 20, and the data dB represents (defines) the waveform of a drive signal COM-B that is supplied to the head unit 20.

The driver circuit 50-$a$ subjects the data dA to digital/analog conversion, subjects the resulting data to class-D amplification, and outputs the resulting drive signal COM-A to the head unit 20. Likewise, the driver circuit 50-$b$ subjects the data dB to digital/analog conversion, subjects the resulting data to class-D amplification, and outputs the resulting drive signal COM-B to the head unit 20. The drive signals COM-A and COM-B are used to generate a drive signal Vout (Vout-1 to Vout-m) applied to a plurality of (m) ejecting sections 600 included in the head unit 20 (described later). Note that the driver circuits 50-$a$ and 50-$b$ may differ from each other only as to the data input thereto and the drive signal output therefrom, and have an identical circuit configuration.

The control section 100 includes an ejection selection signal generation section (ejection selection signal generation circuit) 101. The ejection selection signal generation section (ejection selection signal generation circuit) 101 generates a data signal Data, a clock signal Sck, and control signals LAT and CH (i.e., an ejection selection signal that controls the head unit 20) so that an image corresponding to the image data supplied from the host computer is formed on the surface of the print medium P, and supplies the generated signals to the head unit 20.

The control section 100 may instruct the maintenance unit 80 to perform a maintenance process that allows the ejecting section 600 to recover a normal ink ejection state. The maintenance unit 80 may include a cleaning mechanism 81 that performs a cleaning process (pumping process) (i.e., maintenance process) that sucks a viscous ink, air bubbles, and the like from the ejecting section 600 using a tube pump (not illustrated in the drawings). The maintenance unit 80 may include a wiping mechanism 82 that performs a wiping process (i.e., maintenance process) (m) that wipes off a foreign substance (e.g., paper powder) that adheres to the ejecting section 600 in an area around the nozzle using a wiper (not illustrated in the drawings).

The head unit 20 includes an ejection selection section 70, and an ejecting section group that includes a plurality of ejecting sections 600 (m ejecting sections 600). Note that the head unit 20 may include the driver circuits 50-a and 50-b.

The ejection selection section 70 receives the clock signal Sck, the data signal Data, and the control signals LAT and CH transmitted from the control section 100. In one embodiment of the invention, the data signal Data includes print data SI and program data SP. The print data SI represents the size (grayscale) of a dot that is formed on the print medium P due to the ejection operation performed by each of the m ejecting sections 600. In one embodiment of the invention, the print data SI represents four grayscales ("large dot", "medium dot", "small dot", and "non-recording (no dot)") (as described later). The program data SP is data that selects a drive pulse (waveform) that is applied to a piezoelectric element 60 included in the ejecting section 600 from the drive signals COM-A and COM-B. Specifically, the data signal Data functions as an ejection selection signal that selects the ejection operation performed by each of the m ejecting sections 600.

The ejection selection section 70 includes an SP shift register that holds the program data SP, and an SI shift register that holds the print data SI. The ejection selection section 70 serially transfers (by 1 bit) and holds the print data SI and the program data SP included in the data signal Data using the SI shift register and the SP shift register at the edge timing of the clock signal Sck.

The ejection selection section 70 selects the waveform included in the drive signals COM-A and COM-B based on the print data SI and the program data SP transferred and held by the SI shift register and the SP shift register, and the control signals LAT and CH, and applies m drive signals Vout (Vout-1 to Vout-m) that include the selected waveform respectively to the m ejecting sections 600. Specifically, the ejection selection section 70 selects an ejecting section 600 among the m ejecting sections 600 to which the drive signals COM-A and COM-B are applied corresponding to the data signal Data (ejection selection signal).

The m ejecting sections 600 can eject a liquid droplet having a different size upon application of the drive signal Vout (Vout-1 to Vout-m). More specifically, the ejection selection section 70 applies the m drive signals Vout (Vout-1 to Vout-m) that respectively correspond to one of the four grayscales ("large dot", "medium dot", "small dot", and "non-recording") respectively to the m ejecting sections 600 so that an image that corresponds to the image data is formed on the surface of the print medium P.

3. Configuration of Ejecting Section

The configuration of the ejecting section 600 that ejects an ink upon application of the drive signal Vout to the piezoelectric element 60, is briefly described below. FIG. 3 illustrates a schematic configuration of the head unit 20 that corresponds to one ejecting section 600.

As illustrated in FIG. 3, the ejecting section 600 included in the head unit 20 includes the piezoelectric element 60, a diaphragm 621, a cavity (pressure chamber) 631, and a nozzle 651. The diaphragm 621 is displaced (produces flexural vibrations) due to the displacement of the piezoelectric element 60 that is provided to the upper side of the diaphragm 621 in FIG. 3 to increase or decrease the internal volume of the cavity 631 that is filled with an ink. The nozzle 651 is a hole (open hole) that is provided to the nozzle plate 632, and communicates with the cavity 631. The cavity 631 is filled with a liquid (e.g., ink), and changes in internal volume due to the displacement of the piezoelectric element 60. The nozzle 651 communicates with the cavity 631, and ejects the liquid contained in the cavity 631 in the form of a liquid droplet (droplet) corresponding to a change in the internal volume of the cavity 631.

The piezoelectric element 60 illustrated in FIG. 3 has a structure in which a piezoelectric material 601 is placed between electrodes 611 and 612 that make a pair. The center part of the piezoelectric material 601 is deformed in the upward-downward direction with respect to each end together with the electrodes 611 and 612 and the diaphragm 621 corresponding to a voltage applied between (through) the electrodes 611 and 612. More specifically, the center part of the piezoelectric element 60 is deformed in the upward direction when the voltage of the drive signal Vout has increased, and is deformed in the downward direction when the voltage of the drive signal Vout has decreased. When the center part of the piezoelectric element 60 is deformed in the upward direction, the internal volume of the cavity 631 increases, and the ink is introduced into the cavity 631 from a reservoir 641. When the center part of the piezoelectric element 60 is deformed in the downward direction, the internal volume of the cavity 631 decreases, and the ink is ejected from the nozzle 651 corresponding to the degree of decrease in the internal volume of the cavity 631.

Note that the structure of the piezoelectric element 60 is not limited to the structure illustrated in FIG. 3. It suffices that the piezoelectric element 60 have such a structure that the piezoelectric element 60 can be deformed to eject a liquid (e.g., ink). The piezoelectric element 60 may be configured to utilize longitudinal vibrations instead of flexural vibrations.

4. Configuration of Drive Signal Applied to Ejecting Section

FIG. 4A illustrates an example of the arrangement of the nozzles 651. As illustrated in FIG. 4A, the nozzles 651 are arranged in two rows, for example. More specifically, a plurality of nozzles 651 arranged in each row along the sub-scan direction at a pitch Pv, and a plurality of nozzles 651 arranged in the left row and a plurality of nozzles 651 arranged in the right row are situated away from each other in the main scan direction by a pitch Ph, and are shifted in the sub-scan direction by half of the pitch Pv.

The nozzles 651 are arranged along the main scan direction in a pattern corresponding to each color (e.g., C (cyan), M (Magenta), Y (yellow), and K (black)) when printing a color image, for example. Note that an example in which the grayscale is represented using a single color is described below for convenience of explanation.

FIG. 4B illustrates the basic resolution when forming an image using the nozzle arrangement illustrated in FIG. 4A.

Note that FIG. 4B illustrates an example of a method (first method) that ejects one ink droplet from the nozzle 651 to form one dot for convenience of explanation. Each black circle represents a dot that is formed by an ink droplet.

When the head unit 20 is moved in the main scan direction at a speed v, the dot-to-dot distance D (in the main scan direction) between dots formed by ink droplets (see FIG. 4B) and the speed v have the relationship described below.

Specifically, when one dot is formed by ejecting one ink droplet, the dot-to-dot distance D is represented by a value (=v/f) calculated by dividing the speed v by the ink ejection frequency f (i.e., the moving distance of the head unit 20 in a cycle (1/f) in which an ink droplet is repeatedly ejected).

In the example illustrated in FIGS. 4A and 4B, the pitch Ph has a proportional relationship with the dot-to-dot distance D with respect to a coefficient n so that ink droplets ejected from the nozzles 651 arranged in two rows are placed on the print medium P to form one row. Therefore, the dot-to-dot distance in the sub-scan direction is half of the dot-to-dot distance in the main scan direction (see FIG. 4B). Note that the dot arrangement is not limited to the example illustrated in FIG. 4B.

High-speed printing can be implemented by increasing the speed v at which the head unit 20 is moved in the main scan direction. However, the dot-to-dot distance D increases when the speed v is merely increased. Therefore, it is necessary to increase the number of dots that are formed per unit time by increasing the ink ejection frequency f in order to implement high-speed printing while providing a certain resolution.

The resolution can be increased by increasing the number of dots that are formed per unit area. In this case, however, adjacent dots may unite when the amount of ink is large, and the print speed may decrease when the ink ejection frequency f is low.

Specifically, it is necessary to increase the ink ejection frequency f in order to implement high-speed and high-resolution printing.

A dot may be formed on the print medium P using a method that ejects one ink droplet to form one dot, a method (second method) that ejects one or more (two or more) ink droplets within a unit period so that the ink droplets unite on the print medium to form one dot, or a method (third method) that ejects two or more ink droplets within a unit period so that the ink droplets do not unite on the print medium to form two or more dots.

In one embodiment of the invention, one or two ink droplets are ejected corresponding to one dot using the second method to implement four grayscales ("large dot", "medium dot", "small dot", and "non-recording (no dot)"). In one embodiment of the invention, the drive signals COM-A and COM-B are provided so as to include a first-half pattern and a second-half pattern within one cycle in order to represent the four grayscales. The drive signal COM-A or COM-B is selected (or the drive signals COM-A and COM-B are not selected) according to the target grayscale in each of the first-half period and the second-half period within one cycle, and supplied to the piezoelectric element 60.

FIG. 5 illustrates the waveforms of the drive signals COM-A and COM-B. As illustrated in FIG. 5, the drive signal COM-A has a waveform in which a trapezoidal waveform Adp1 and a trapezoidal waveform Adp2 are provided sequentially, the trapezoidal waveform Adp1 being provided in a period T1 that starts at the rising edge of the control signal LAT and ends at the rising edge of the control signal CH, and the trapezoidal waveform Adp2 being provided in a period T2 that starts at the rising edge of the control signal CH and ends at the rising edge of the control signal LAT. A print cycle Ta consists of the periods T1 and T2, and a new dot is formed on the print medium P in each cycle Ta.

In one embodiment of the invention, the trapezoidal waveforms Adp1 and Adp2 are almost identical to each other. When each of the trapezoidal waveforms Adp1 and Adp2 is supplied to one end of the piezoelectric element 60, a predetermined amount (i.e., medium amount) of ink is ejected from the nozzle 651 that corresponds to the piezoelectric element 60.

The drive signal COM-B has a waveform in which a trapezoidal waveform Bdp1 that is provided in the period T1 and a trapezoidal waveform Bdp2 that is provided in the period T2 are provided sequentially. In one embodiment of the invention, the trapezoidal waveforms Bdp1 and Bdp2 differ from each other. The trapezoidal waveform Bdp1 is a waveform that prevents an increase in the viscosity of the ink by finely vibrating the ink that is situated in the vicinity of the opening of the nozzle 651. Therefore, when the trapezoidal waveform Bdp1 is supplied to one end of the piezoelectric element 60, an ink droplet is not ejected from the nozzle 651 that corresponds to the piezoelectric element 60. The trapezoidal waveform Bdp2 differs from the trapezoidal waveform Adp1 (Adp2). When the trapezoidal waveform Bdp2 is supplied to one end of the piezoelectric element 60, the ink is ejected from the nozzle 651 that corresponds to the piezoelectric element 60 in an amount smaller than the specific amount.

Note that the voltage at the start timing of the trapezoidal waveforms Adp1, Adp2, Bdp1, and Bdp2 and the voltage at the end timing of the trapezoidal waveforms Adp1, Adp2, Bdp1, and Bdp2 are identical (i.e., voltage Vc). Specifically, the trapezoidal waveforms Adp1, Adp2, Bdp1, and Bdp2 start at the voltage Vc, and end at the voltage Vc.

The ejection selection section 70 combines the waveform of the drive signal COM-A or COM-B that corresponds to the period T1 and the waveform of the drive signal COM-A or COM-B that corresponds to the period T2 based on the data signal Data (print data SI and program data SP) transferred and held by the SI shift register and the SP shift register, and the control signals LAT and CH, and applies the drive signal Vout (Vout-1 to Vout-m) that corresponds to "large dot", "medium dot", "small dot", or "non-recording" to the m ejecting sections 600.

FIG. 6 illustrates the waveform of the drive signals Vout that respectively correspond to "large dot", "medium dot", "small dot", and "non-recording".

As illustrated in FIG. 6, the drive signal Vout that corresponds to "large dot" has a waveform that includes the trapezoidal waveform Adp1 of the drive signal COM-A that corresponds to the period T1, and the trapezoidal waveform Adp2 of the drive signal COM-A that corresponds to the period T2, the trapezoidal waveforms Adp1 and Adp2 being provided sequentially. When the drive signal Vout that corresponds to "large dot" is supplied to one end of the piezoelectric element 60, a medium amount of ink (ink droplet) is ejected twice from the nozzle 651 that corresponds to the piezoelectric element 60 in the cycle Ta. The ink droplets thus ejected are placed on the print medium P, and unite to form a large dot.

The drive signal Vout that corresponds to "medium dot" has a waveform that includes the trapezoidal waveform Adp1 of the drive signal COM-A that corresponds to the period T1, and the trapezoidal waveform Bdp2 of the drive signal COM-B that corresponds to the period T2, the trapezoidal waveforms Adp1 and Bdp2 being provided sequentially. When the drive signal Vout that corresponds to "medium dot" is supplied to one end of the piezoelectric element 60, a medium amount of ink (ink droplet) and a small amount of ink (ink droplet) are separately ejected from the nozzle 651 that corresponds to the piezoelectric element 60 in the cycle Ta. The ink droplets thus ejected are placed on the print medium P, and unite to form a medium dot.

The drive signal Vout that corresponds to "small dot" is maintained at the voltage Vc during the period T1 due to the capacitive characteristics of the piezoelectric element 60, and has the trapezoidal waveform Bdp2 of the drive signal COM-B during the period T2. When the drive signal Vout that corresponds to "small dot" is supplied to one end of the piezoelectric element 60, a small amount of ink (ink droplet) is ejected from the nozzle 651 that corresponds to the piezoelectric element 60 only during the period T2 in the cycle Ta. The ink droplet thus ejected is placed on the print medium P to form a small dot.

The drive signal Vout that corresponds to "non-recording" has the trapezoidal waveform Bdp1 of the drive signal COM-B during the period T1, and is maintained at the voltage Vc during the period T2 due to the capacitive characteristics of the piezoelectric element 60. When the drive signal Vout that corresponds to "non-recording" is supplied to one end of the piezoelectric element 60, the nozzle 651 that corresponds to the piezoelectric element 60 is finely vibrated during the period T2 in the cycle Ta, and no ink (ink droplet) is ejected. Therefore, no ink droplet is placed (i.e., no dot is formed) on the print medium P.

In one embodiment of the invention, the print data SI is 2m-bit data that includes 2-bit print data (SIH, SIL) corresponding to each of the m ejecting sections 600. More specifically, the print data SI sequentially (from the head) includes the 2-bit print data (SIH-1, SIL-1) that is supplied to the first ejecting section 600, the 2-bit print data (SIH-2, SIL-2) that is supplied to the second ejecting section 600, . . . , and the 2-bit print data (SIH-m, SIL-m) that is supplied to the mth ejecting section 600.

Specifically, the print data SI includes the 2-bit print data (SIH-1, SIL-1) (first ejecting section bit data group) that includes a plurality of pieces of first ejecting section control bit data including first ejecting section first control bit data SIH-1 and first ejecting section second control bit data SIL-1 that control the size of a liquid droplet that is ejected from the first ejecting section 600 (i.e., first ejecting section). The print data SI also includes the 2-bit print data (SIH-2, SIL-2) (second ejecting section bit data group) that includes a plurality of pieces of second ejecting section control bit data including second ejecting section first control bit data SIH-2 and second ejecting section second control bit data SIL-2 that control the size of a liquid droplet that is ejected from the second ejecting section 600 (i.e., second ejecting section). The print data SI includes the 2-bit print data (SIH-2, SIL-2) so as to follow the 2-bit print data (SIH-1, SIL-1). Specifically, the ejection selection signal generation section (ejection selection signal generation circuit) 101 generates the data signal Data (ejection selection signal) so that the print data (SIH-2, SIL-2) (second ejecting section bit data group) follows the print data (SIH-1, SIL-1) (first ejecting section bit data group).

In one embodiment of the invention, the program data SP is 16-bit data that includes 4-bit data that defines selection/non-selection of the waveform of each of the drive signals COM-A and COM-B that corresponds to the period T1, and selection/non-selection of the waveform of each of the drive signals COM-A and COM-B that corresponds to the period T2 corresponding to each of "large dot", "medium dot", "small dot", and "non-recording".

The ejection selection section 70 shifts the data signal Data by 1 bit at the edge timing of the clock signal Sck so that the 2m-bit print data SI is held by the 2m-bit SI shift register, and the 16-bit program data SP is held by the 16-bit SP shift register.

The ejection selection section 70 causes a 2m-bit SI latch to receive and hold the 2m-bit print data SI held by the 2m-bit SI shift register at the edge timing of the control signal LAT. Likewise, the ejection selection section 70 causes a 16-bit SP latch to receive and hold the 16-bit program data SP held by the 16-bit SP shift register at the edge timing of the control signal LAT. The ejection selection section 70 generates the m drive signals Vout-1 to Vout-m based on the print data SI held by the SI latch and the program data SP held by the SP latch.

5. Configuration of Ejection Selection Section

FIG. 7 illustrates the functional configuration of the ejection selection section 70. As illustrated in FIG. 7, the ejection selection section 70 includes the 16-bit SP shift register that includes sixteen flip-flops (F/F) that hold the 16-bit program data SP (SP-1 to SP-16). The data signal Data is input to the first-stage flip-flop (F/F) of the SP shift register that holds the program data SP-16.

The ejection selection section 70 includes the 2m-bit SI shift register in which 2m flip-flops (F/F) that hold the 2-bit print data (SIL-m, SIH-m) that is supplied to the mth ejecting section 600, . . . , the 2-bit print data (SIL-2, SIH-2) that is supplied to the second ejecting section 600, and the 2-bit print data (SIL-1, SIH-1) that is supplied to the first ejecting section 600, are sequentially connected. The 2m-bit SI shift register is provided in the subsequent stage of the 16-bit SP shift register.

The clock signal Sck is input in common to the sixteen flip-flops included in the SP shift register and the 2m flip-flops included in the 2m-bit SI shift register, and the data signal Data is input while being shifted by 1 bit at the edge timing of the clock signal Sck. Therefore, the data held by the SP shift register and the data held by the SI shift register are updated while the data signal Data is transferred.

In one embodiment of the invention, the data signal Data transmitted from the control section 100 in each cycle Ta includes the 2m-bit print data SI and the 16-bit program data SP. The clock signal Sck that includes (2m+16) pulses is transmitted from the control section 100 in synchronization with the data signal Data. Therefore, the SI shift register holds the 2m-bit print data SI, and the SP shift register holds the 16-bit program data SP at the timing of the last ((2m+16)th) pulse included in the clock signal Sck.

As illustrated in FIG. 7, the ejection selection section 70 includes an SIH-1 flip-flop (F/F) and an SIL-1 flip-flop (F/F) (first data-holding section) that hold the 2-bit print data (SIH-1, SIL-1) (first ejecting section bit data group). The ejection selection section 70 includes an SIH-2 flip-flop (F/F) and an SIL-2 flip-flop (F/F) (second data-holding section) that hold the 2-bit print data (SIH-2, SIL-2) (second ejecting section bit data group). The SIH-2 flip-flop and the SIL-2 flip-flop are provided in the preceding stage of the SIH-1 flip-flop and the SIL-1 flip-flop. The data signal Data is input to the SIH-2 flip-flop and the SIL-2 flip-flop, and then input to the SIH-1 flip-flop and the SIL-1 flip-flop.

As illustrated in FIG. 7, the ejection selection section 70 includes the 16-bit SP latch that includes SP-1 to SP-16 latches. The ejection selection section 70 includes the 2m-bit SI latch that includes an SIH-1 latch, an SIL-1 latch, an SIH-2 latch, an SIL2 latch, . . . , an SIH-m latch, and an SIL-m latch. The control signal LAT is input in common to the SP-1 to SP-16 latches included in the SP latch, the SIH-1 latch, the SIL-1 latch, the SIH-2 latch, the SIL-2 latch, . . . , the SIH-m latch, and the SIL-m latch included in the SI latch.

The program data SP (SP-1 to SP-16) held by (stored in) the SP shift register is input to the SP latch (SP-1 to SP-16 latches) at the edge timing of the control signal LAT. Likewise, the 2m-bit print data SI (SIH-1, SIL-1, SIH-2, SIL-2, . . . , SIH-m, and SIL-m) held by (stored in) the SI shift register is input to the SI latch (SIH-1 latch, SIL-1 latch, SIH-2 latch, SIL-2 latch, . . . , SIH-m latch, and SIL-m latch) at the edge timing of the control signal LAT.

The control section 100 transmits the pulse of the control signal LAT in each print cycle Ta (see above). Therefore, the program data SP held by the SP latch and the print data SI held by the SI latch are updated in each print cycle Ta based on the control signal LAT. FIG. 8 illustrates the waveform of each signal supplied to the ejection selection section 70 from the control unit 10, and the update timing of the SP latch and the SI latch.

As illustrated in FIG. 7, the ejection selection section 70 includes m decoders DEC-1 to DEC-m. The control signal LAT, the control signal CH, and the program data SP-1 to SP-16 held by the SP-1 to SP-16 latches are input in common to the m decoders DEC-1 to DEC-m. The 2-bit print data (SIH-i, SIL-i) (i is 1 to m) held by the SIH-i latch and the SIL-i latch is input to the ith decoder DEC-i. The decoder DEC-i outputs a control signal Sa-i that controls selection/non-selection of the drive signal COM-A and a control signal Sb-i that controls selection/non-selection of the drive signal COM-B according to a predetermined decoding logic. In one embodiment of the invention, a common decoding logic is applied to the m decoders DEC-1 to DEC-m.

The drive signal COM-A or the drive signal COM-B selected by the control signal Sa-i or the control signal Sb-i is output from the ejection selection section 70 as the drive signal Vout-i through transmission gates (analog switches) TGa-i and TGb-i.

In FIG. 7, the SIH-1 flip-flop, the SIL-1 flip-flop, the SIH-1 latch, the SIL-1 latch, and the decoder DEC-1 form a first waveform selection signal generation circuit 71-1, and the first waveform selection signal generation circuit 71-1 generates the control signals Sa-1 and Sb-1 (first waveform selection signal) for generating the drive signal Vout-1 based on the data signal Data (ejection selection signal). The first waveform selection signal generation circuit 71-1 includes the SIH-1 flip-flop and the SIL-1 flip-flop (first data-holding section), and generates the control signals Sa-1 and Sb-1 (first waveform selection signal) based on the 2-bit print data (SIH-1, SIL-1) (first ejecting section bit data group) held by the SIH-1 flip-flop and the SIL-1 flip-flop. The SIH-2 flip-flop, the SIL-2 flip-flop, the SIH-2 latch, the SIL-2 latch, and the decoder DEC-2 form a second waveform selection signal generation circuit 71-2, and the second waveform selection signal generation circuit 71-2 generates the control signals Sa-2 and Sb-2 (second waveform selection signal) for generating the drive signal Vout2 based on the data signal Data (ejection selection signal). The second waveform selection signal generation circuit 71-2 includes the SIH-2 flip-flop and the SIL-2 flip-flop (second data-holding section), and generates the control signals Sa-2 and Sb-2 (second waveform selection signal) based on the 2-bit print data (SIH-2, SIL-2) (second ejecting section bit data group) held by the SIH-2 flip-flop and the SIL-2 flip-flop. The ejection selection section 70 includes a plurality of (m) waveform selection signal generation circuits 71-1 to 71-m having the same configuration.

In FIG. 7, the transmission gates TGa-1 and TGb-1 form a first drive signal selection circuit 72-1, and the first drive signal selection circuit 72-1 selects the waveform included in the drive signals COM-A and COM-B based on the control signals Sa-1 and Sb-1 (first waveform selection signal), and applies the drive signal Vout-1 that includes the selected waveform to the first ejecting section 600. The transmission gates TGa-2 and TGb-2 form a second drive signal selection circuit 72-2, and the second drive signal selection circuit 72-2 selects the waveform included in the drive signals COM-A and COM-B based on the control signals Sa-2 and Sb-2 (second waveform selection signal), and applies the drive signal Vout-2 that includes the selected waveform to the second ejecting section 600. The ejection selection section 70 includes a plurality of (m) drive signal selection circuits 72-1 to 72-m having the same configuration.

FIG. 9 is a table illustrating the decoding logic applied to the decoder DEC-i. In one embodiment of the invention, the program data SP-1 to SP-4 are fixed at (1, 0, 1, 0), the program data SP-5 to SP-8 are fixed at (1, 0, 0, 1), the program data SP-9 to SP12 are fixed at (0, 0, 0, 1), and the program data SP-13 to SP-16 are fixed at (0, 1, 0, 0) (see FIG. 9).

When the 2-bit print data (SIH-i, SIL-i) is (1, 1), the control signal Sa-i is set to a high level according to the program data SP-1 (=1), and the control signal Sb-i is set to a low level according to the program data SP-2 (=0) during the period T1 that starts at the rising edge of the control signal LAT and ends at the rising edge of the control signal CH. Therefore, the drive signal COM-A (trapezoidal waveform Adp1) is selected as the drive signal Vout-i during the period T1. The control signal Sa-i is set to a high level according to the program data SP-3 (=1), and the control signal Sb-i is set to a low level according to the program data SP-4 (=0) during the period T2 that starts at the rising edge of the control signal CH and ends at the rising edge of the control signal LAT. Therefore, the drive signal COM-A (trapezoidal waveform Adp2) is selected as the drive signal Vout-i during the period T2. Therefore, when the 2-bit print data (SIH-i, SIL-i) is (1, 1), the drive signal Vout-i that corresponds to "large dot" (see FIG. 6) is generated.

When the 2-bit print data (SIH-i, SIL-i) is (1, 0), the control signal Sa-i is set to a high level according to the program data SP-5 (=1), and the control signal Sb-i is set to a low level according to the program data SP-6 (=0) during the period T1. Therefore, the drive signal COM-A (trapezoidal waveform Adp1) is selected as the drive signal Vout-i during the period T1. The control signal Sa-i is set to a low level according to the program data SP-7 (=0), and the control signal Sb-i is set to a high level according to the program data SP-8 (=1) during the period T2. Therefore, the drive signal COM-B (trapezoidal waveform Bdp2) is selected as the drive signal Vout-i during the period T2. Therefore, when the 2-bit print data (SIH-i, SIL-i) is (1, 0), the drive signal Vout-i that corresponds to "medium dot" (see FIG. 6) is generated.

When the 2-bit print data (SIH-i, SIL-i) is (0, 1), the control signal Sa-i is set to a low level according to the program data SP-9 (=0), and the control signal Sb-i is set to a low level according to the program data SP-10 (=0) during the period T1. Therefore, the drive signals COM-A and COM-B are not selected during the period T1, and one end of the piezoelectric element 60 is set to an open state. However, the drive signal Vout-i is maintained at the voltage Vc due to the capacitive characteristics of the piezoelectric element 60. The control signal Sa-i is set to a low level according to the program data SP-11 (=0), and the control signal Sb-i is set to a high level according to the program data SP-12 (=1) during the period T2. Therefore, the drive signal COM-B (trapezoidal waveform Bdp2) is selected as the drive signal Vout-i during the period T2. Therefore, when the 2-bit print data (SIH-i, SIL-i) is (0, 1), the drive signal Vout-i that corresponds to "small dot" (see FIG. 6) is generated.

When the 2-bit print data (SIH-i, SIL-i) is (0, 0), the control signal Sa-i is set to a low level according to the program data SP-13 (=0), and the control signal Sb-i is set to a high level according to the program data SP-14 (=1) during the period T1. Therefore, the drive signal COM-B (trapezoidal waveform Bdp1) is selected as the drive signal Vout-i during the period T1. The control signal Sa-i is set to a low level according to the program data SP-15 (=0), and the control signal Sb-i is set to a low level according to the program data SP-16 (=0) during the period T2. Therefore, the drive signals COM-A and COM-B are not selected during the period T2, and one end of the piezoelectric element 60 is set to an open state. However, the drive signal Vout-i is maintained at the voltage Vc due to the capacitive characteristics of the piezoelectric element 60. Therefore, when the 2-bit print data (SIH-i, SIL-i) is (0, 0), the drive signal Vout-i that corresponds to "non-recording" (see FIG. 6) is generated.

6. Layout of Ejection Selection Section

In one embodiment of the invention, the ejection selection section 70 is implemented by an integrated circuit (IC). Specifically, the functional configuration of the ejection selection section 70 illustrated in FIG. 7 is implemented by integrating devices such as a metal oxide semiconductor field effect transistor (MOSFET) on a semiconductor substrate.

FIG. 10 illustrates the layout of an IC 90 that implements the ejection selection section 70 according to one embodiment of the invention. FIG. 11 illustrates the layout of an IC 92 that implements an ejection selection section according to a comparative example. FIG. 12 illustrates the functional configuration of the ejection selection section according to the comparative example, and FIG. 13 illustrates the waveform of each signal supplied to the ejection selection section according to the comparative example from the control unit 10.

FIG. 10 is a plan view illustrating the IC 90 according to one embodiment of the invention. As illustrated in FIG. 10, the IC 90 has a rectangular shape having long sides X1 and X2 and short sides Y1 and Y2 in a plan view.

In one embodiment of the invention, the nozzles 651 of the odd-numbered (first, third, . . . , and (m−1)th) ejecting sections 600 among the m ejecting sections 600 are arranged in one row (e.g., the left row in FIG. 4A), and the nozzles 651 of the evennumbered (second, fourth, . . . , and mth) ejecting sections 600 among the m ejecting sections 600 are arranged in another row (e.g., the right row in FIG. 4A). As illustrated in FIG. 10, a plurality of terminals T_Vout-1, . . . , and T_Vout-(m−1) are provided along the long side X2 of the IC 90 corresponding to the arrangement of the nozzles 651, and a plurality of terminals T_Vout-2, . . . , and T_Vout-m are provided along the long side X1 of the IC 90 corresponding to the arrangement of the nozzles 651. Therefore, the long sides X1 and X2 are significantly longer than the short sides Y1 and Y2, and the IC 90 has a very narrow rectangular shape.

A plurality of drive signals Vou t−1, . . . , and Vout-(m−1) are generated by the drive signal generation circuits 72-1, . . . , and 72-(m−1), and output from the terminals T_Vout-1, . . . , and T_Vout-(m−1), respectively. A plurality of drive signals Vou t−2, . . . , and Vout-m are generated by the drive signal generation circuits 72-2, . . . , and 72-m, and output from the terminals T_Vout-2, . . . , and T_Vout-m, respectively. The m waveform selection signal generation circuits 71-1 to 71-m are arranged in the direction that extends along the long sides X1 and X2 of the IC 90 (in a plan view) corresponding to the m drive signal selection circuits 72-1 to 72-m.

As illustrated in FIG. 10, terminals T_Sck, T_Data, T_COM-AL T_COM-B1, T_COM-A2, and T_COM-B2 are provided along the short side Y1 of the IC 90. The clock signal Sck (see FIG. 7) is input through the terminal T_Sck, and the data signal Data (see FIG. 7) is input through the terminal T_Data. The drive signal COM-A (see FIG. 7) is input through the terminals T_COM-A1 and T_COM-A2, and the drive signal COM-B (see FIG. 7) is input through the terminals T_COM-B1 and T_COM-B2. The drive signals COM-A and COM-B input through the terminals T_COM-A1 and T_COM-B1 are input to the drive signal selection circuits 72-2, . . . , and 72-m, and the drive signals COM-A and COM-B input through the terminals T_COM-A2 and T_COM-B2 are input to the drive signal selection circuits 72-1, . . . , and 72-(m−1). Note that the terminals through which the control signals LAT and CH are input are omitted in FIG. 10.

The clock signal Sck and the data signal Data among the signals input to the IC 90 are set at a relatively low voltage (e.g., 0 to 3V), and the drive signals COM-A and COM-B among the signals input to the IC 90 are set at a very high voltage (e.g., up to about 40 V). Therefore, the IC 90 includes both a device that operates at a low voltage, and a device that operates at a high voltage. In one embodiment of the invention, the m waveform selection signal generation circuits 71-1 to 71-m that include only a device that operates at a low voltage are provided in an area situated away from the long sides X1 and X2, and the m drive signal selection circuits 72-1 to 72-m that include a device that operates at a high voltage are provided in an area situated close to the long side X1 or X2. The terminal T_Sck through which the clock signal Sck is input, and the terminal T_Data through which the data signal Data is input, are provided at positions along the short side Y1 of the IC 90 so as to be situated away from the long sides X1 and X2 corresponding to the arrangement of the m waveform selection signal generation circuits 71-1 to 71-m to which the clock signal Sck and the data signal Data are supplied. The terminals T_COM-A1 and T_COM-A2 through which the drive signal COM-A is input, and the terminals T_COM-B1 and T_COM-B2 through which the drive signal COM-B is input, are provided at positions along the short side Y1 of the IC 90 so as to be situated close to the long side X1 or X2 corresponding to the arrangement of the m drive signal selection circuits 72-1 to 72-m to which the drive signals COM-A and COM-B are supplied. The IC 90 is thus configured so that the placement area of a circuit that operates at a low voltage and a low-voltage signal line is efficiently separated from the placement area of a circuit that operates at a high voltage and a high-voltage signal line.

The IC 92 that implements the ejection selection section according to the comparative example (see FIG. 11) also has the above feature. As illustrated in FIG. 13, however, the ejection selection section according to the comparative example differs from the ejection selection section 70 according to one embodiment of the invention in that the print data SI included in the data signal Data that is input to the ejection selection section sequentially (from the head) includes the data SIH-1 to SIH-m and SIL-1 to SIL-m. Therefore, the data signal Data is sequentially transferred to the waveform selection signal generation circuits 71-$m$, 71-($m$−1), . . . , 71-2, and 71-1, and then sequentially transferred to the waveform selection signal generation circuits 71-$m$, 71-($m$−1), . . . , 71-2, and 71-1 in synchronization with the clock signal Sck (see FIGS. 11 and 12). Note that the waveform selection signal generation circuits 71-$m$, 71-($m$−1), . . . , 71-2, and 71-1 are omitted in FIG. 12 for convenience of illustration. Each element illustrated in FIG. 12 is the same as each element illustrated in FIG. 7.

In the comparative example, the clock signal Sck is input first to the SIH-1 flip-flop (final-stage flip-flop) among the 2m flip-flops included in the SI shift register, and then sequentially input to the remaining flip-flops. On the other hand, the data signal Data is input first to the SIL-m flip-flop (first-stage flip-flop) among the 2m flip-flops included in the SI shift register, and then sequentially input to the SIL-(m−1) to SIL-1 flip-flops. The data signal Data is then input to the SIH-m flip-flop, and sequentially input to the SIH-(m−1) to SIH-1 flip-flops. Specifically, since the clock signal Sck is input to the SIH-(m−1) flip-flop after the clock signal Sck has been input to the SIL-1 flip-flop when the data is transferred from the SIL-1 flip-flop to the SIH-(m−1) flip-flop (see FIG. 11), it may be impossible to provide a hold time or a setup time. In particular, a higher load is applied to a data transfer line from the SIL-1 flip-flop to the SIH-(m−1) flip-flop, and a clock signal line provided between the SIL-1 flip-flop and the SIH-(m−1) flip-flop as the number m of ejecting sections 600 (number of nozzles 651) is increased in order to implement high resolution, and it is more likely that it is impossible to provide a hold time or a setup time. Therefore, the IC 92 that implements the ejection selection section according to the comparative example has a problem in that a shift in data transfer timing easily occurs, and a malfunction tends to occur.

According to one embodiment of the invention, the data signal Data is sequentially transferred to the waveform selection signal generation circuits 71-$m$, 71-($m$−1), . . . , 71-2, and 71-1 in synchronization with the clock signal Sck (see FIG. 7). The clock signal Sck is input first to the waveform selection signal generation circuit 71-1 among the m waveform selection signal generation circuits 71-1 to 71-$m$ that is situated closest to the short side Y1 where the clock signal Sck is input, and finally input to the waveform selection signal generation circuit 71-$m$ that is situated farthest from the short side Y1. On the other hand, the data signal Data is input first to the waveform selection signal generation circuit 71-$m$ among the m waveform selection signal generation circuits 71-1 to 71-$m$ that is situated farthest from the short side Y1 where the clock signal Sck is input, and finally input to the waveform selection signal generation circuit 71-1 that is situated closest to the short side Y1.

More specifically, the clock signal Sck is input first to the SIH-1 flip-flop (final-stage flip-flop) among the 2m flip-flops included in the SI shift register, and then sequentially input to the remaining flip-flops. On the other hand, the data signal Data is input first to the SIL-m flip-flop (first-stage flip-flop) among the 2m flip-flops included in the SI shift register, and then sequentially input to the remaining flip-flops. Specifically, since the clock signal Sck is sequentially input to two arbitrary flip-flops among the 2m flip-flops included in the SI shift register which are adjacent to each other and between which data is transferred directly so that the clock signal Sck is input to one of the two arbitrary flip-flops that transfers data after the clock signal Sck has been input to the other of the two arbitrary flip-flops to which data is transferred, it is possible to provide a sufficient hold time. Since data is necessarily transferred between two flip-flops that are adjacent to each other, only a low load is applied to the data transfer line, and it is easy to provide a setup time. Since the load applied to a data transfer line and a clock signal line between two flip-flops that are adjacent to each other changes to only a small extent even when the number m of ejecting sections 600 (number of nozzles 651) is increased in order to implement high resolution, it is possible to provide a sufficient hold time and a sufficient setup time. Therefore, the IC 90 that implements the ejection selection section 70 according to one embodiment of the invention has an advantage in that a shift in data transfer timing rarely occurs, and a malfunction rarely occurs.

According to one embodiment of the invention, since the load applied to the data transfer line decreases, it is possible to reduce the size of a buffer (not illustrated in FIGS. 10 and 11) that buffers the data signal, or omit a buffer. Therefore, it is possible to reduce noise generated by a buffer, and reduce the size of the IC 90.

FIG. 14 illustrates another layout of the IC 90 that implements the ejection selection section 70 according to one embodiment of the invention. The arrangement of the m waveform selection signal generation circuits 71-1 to 71-$m$ and the m drive signal selection circuits 72-1 to 72-$m$ illustrated in FIG. 14 is the same as the arrangement of the m waveform selection signal generation circuits 71-1 to 71-$m$ and the m drive signal selection circuits 72-1 to 72-$m$ illustrated in FIG. 10. In FIG. 14, the terminals T_Sck, T_Data, T_COM-A1, T_COM-B1, T_COM-A2, and T_COM-B2 are provided along the short side Y2 of the IC 90, differing from FIG. 10. The clock signal Sck is input first to the waveform selection signal generation circuit 71-1 among the m waveform selection signal generation circuits 71-1 to 71-$m$ that is situated farthest from the short side Y2 where the clock signal Sck is input, and finally input to the waveform selection signal generation circuit 71-$m$ that is situated closest to the short side Y2. On the other hand, the data signal Data is input first to the waveform selection signal generation circuit 71-$m$ among the m waveform selection signal generation circuits 71-1 to 71-$m$ that is situated closest to the short side Y2 where the clock signal Sck is input, and finally input to the waveform selection signal generation circuit 71-1 that is situated farthest from the short side Y2.

In the example illustrated in FIG. 14, the clock signal Sck is input first to the SIH-1 flip-flop (final-stage flip-flop) among the 2m flip-flops included in the SI shift register, and then sequentially input to the remaining flip-flops in the same manner as in the example illustrated in FIG. 10. On the other hand, the data signal Data is input first to the SIL-m flip-flop (first-stage flip-flop) among the 2m flip-flops included in the SI shift register, and then sequentially input to the remaining flip-flops. Specifically, since the clock signal Sck is sequentially input to two arbitrary flip-flops among the 2m flip-flops included in the SI shift register which are adjacent to each other and between which data is transferred directly so that the clock signal Sck is input to one of the two arbitrary flip-flops that transfers data after the clock signal Sck has been input to the other of the two arbitrary flip-flops to which data is transferred, it is possible to provide a sufficient hold time. Since data is necessarily transferred between two flip-flops that are adjacent to each other, only a low load is applied to the data transfer line, and it is easy to provide a setup time. Since the load applied to a data transfer line and a clock signal line between two flip-flops that are adjacent to each other changes to only a small extent even when the number m of ejecting sections 600 (number of nozzles 651) is increased in order to implement high resolution, it is possible to provide a sufficient hold time and a sufficient setup time. Therefore, the IC 90 that implements the ejection selection section 70 according to one embodiment of the invention has an advantage in that a shift in data transfer timing rarely occurs, and a malfunction rarely occurs.

7. Advantageous effects

As described above, the liquid ejecting device 1 according to the embodiments of the invention is configured so that the print data SI included in the data signal Data that is transmitted to the ejection selection section 70 from the control section 100 includes the print data SIH-1, SIL-1, SIH-2, SIL-2, . . . , SIH-m, and SIL-m. Therefore, the ejection selection section 70 collectively receives the 2-bit print data (SIH-1, SIL-1) that controls the size of a liquid droplet that is ejected from the first ejecting section 600, the 2-bit print data (SIH-2, SIL-2) that controls the size of a liquid droplet that is ejected from the second ejecting section 600, . . . , and the 2-bit print data (SIH-m, SIL-m) that controls the size of a liquid droplet that is ejected from the mth ejecting section 600. The liquid ejecting device 1 according to the embodiments of the invention is thus configured so that the order with regard to the physical position of each flip-flop that holds each 2-bit print data within the SI shift register is consistent with the order in which the ejection selection section 70 receives each 2-bit print data, and the length of the path (line) through which the print data SI propagates decreases. Therefore, since the liquid ejecting device 1 according to the embodiments of the invention can reduce the possibility that a shift in timing occurs when the ejection selection section 70 transfers the print data SI, the liquid ejecting device according to the embodiments of the invention can reduce the possibility that erroneous ejection occurs, and produce high-quality printed matter while reducing the amount of waste (paper). Since the liquid ejecting device 1 according to the embodiments of the invention can reduce the possibility that a shift in timing occurs when the ejection selection section 70 transfers the print data SI, it is possible to transfer the print data SI at high speed, and implement high-speed printing.

In particular, the liquid ejecting device 1 according to the embodiments of the invention is configured so that the clock signal Sck is input first to the final-stage flip-flop among the 2m flip-flops included in the SI shift register, and then sequentially input to the remaining flip-flops, and the data signal Data is input first to the first-stage flip-flop among the 2m flip-flops included in the SI shift register, and then sequentially input to the remaining flip-flops (see FIG. 10 or 14). Specifically, since the clock signal Sck is input to the flip-flop that transfers data after the clock signal Sck has been input to the flip-flop to which data is transferred, it is possible to provide a sufficient hold time. Since the order of each bit data included in the print data SI is consistent with the order with regard to the physical position of each flip-flop that holds each bit data, it is possible to reduce the load applied to the data transfer line, and it is easy to provide a setup time. Therefore, the liquid ejecting device 1 according to the embodiments of the invention can reduce occurrence of a shift in data transfer timing in the ejection selection section 70 even when the number m of ejecting sections 600 (number of nozzles 651) is increased in order to implement high resolution. This makes it possible to ensure that the IC 90 and the liquid ejecting device 1 operate in a stable manner, reduce the possibility that erroneous ejection occurs, and produce high-quality printed matter while reducing the amount of waste (paper).

The liquid ejecting device 1 according to the embodiments of the invention includes the IC 90 that implements the ejection selection section 70 that is configured so that the placement area of the low-voltage signal line (e.g., clock signal (Sck) line and data signal (Data) line) and the m waveform selection signal generation circuits 71-1 to 71-m that operate at a low voltage is efficiently separated from the placement area of the high-voltage signal line (e.g., drive signal (COM-A) line and drive signal (COM-B) line) and the m drive signal selection circuits 72-1 to 72-m that operate at a high voltage (see FIG. 10). Therefore, the liquid ejecting device 1 according to the embodiments of the invention can reduce the effect of noise from the high-voltage signal line and the circuit that operates at a high voltage on the low-voltage signal line and the circuit that operates at a low voltage while controlling an increase in the size of the IC 90. The liquid ejecting device 1 according to the embodiments of the invention can thus reduce the possibility that erroneous ejection occurs, and produce high-quality printed matter.

8. Modifications

<First Modification>

The embodiments have been described above taking an example in which the print data SI transmitted from the control section 100 to the ejection selection section 70 includes m pieces of 2-bit print data (SIH-1, SIL-1) (SIH-2, SIL-2), . . . , and (SIH-m, SIL-m) in order to select the drive signal Vout that is supplied to each of the m ejecting sections 600 from the drive signals Vout that respectively correspond to "large dot", "medium dot", "small dot", and "non-recording". According to a first modification, the print data SI transmitted from the control section 100 to the ejection selection section 70 includes m pieces of 3-bit print data (SIH-1, SIM-1, SIL-1), (SIH-2, SIM-2, SIL-2), . . . , and (SIH-m, SIM-m, SIL-m). Specifically, the ejection selection section 70 selects the drive signal Vout that is supplied to each of the m ejecting sections 600 from five or more drive signals Vout based on the print data SI and the program data SP. For example, the ejection selection section 70 may be configured to select the drive signal Vout based on the 3-bit print data from five or more drive signals that differ in the size of a liquid droplet that is ejected from the nozzle 651 of the ejecting section 600, or may be configured to select the drive signal Vout based on the 3-bit print data from four or more drive signals that differ in the size of a liquid droplet that is ejected from the nozzle 651 of the ejecting section 600, and a check drive signal. According to the first modification, three drive signals COM-A, COM-B, and COM-C are transmitted to the ejection selection section 70 from the control unit 10 so that the ejection selection section 70 can generate five or more drive signals Vout.

FIG. 15 illustrates the functional configuration of the ejection selection section 70 according to the first modification. As illustrated in FIG. 15, the ejection selection section 70 according to the first modification includes an n-bit SP shift register that includes n flip-flops (F/F) that hold n-bit program data SP (SP-1 to SP-n). The data signal Data is input to the first-stage flip-flop (F/F) of the SP shift register that holds the program data SP-n.

The ejection selection section 70 according to the first modification includes a 3m-bit SI shift register in which 3m flip-flops that hold the 3-bit print data (SIL-m, SIM-m, SIH-m) that is supplied to the mth ejecting section 600, . . . , the 3-bit print data (SIL-2, SIM-2, SIH-2) that is supplied to the second ejecting section 600, and the 3-bit print data (SIL-1, SIM-1, SIH-1) that is supplied to the first ejecting section 600, are sequentially connected. The 3m-bit SI shift register is provided in the subsequent stage of the n-bit SP shift register.

The clock signal Sck is input in common to the n flip-flops included in the SP shift register and the 3m flip-flops included in the 3m-bit SI shift register, and the data signal Data is input while being shifted by 1 bit at the edge timing of the clock signal Sck. Therefore, the data held by the SP shift register and the data held by the SI shift register are updated while the data signal Data is transferred.

According to the first modification, the data signal Data transmitted from the control section 100 in each cycle Ta includes the 3m-bit print data SI and the n-bit program data SP. The clock signal Sck that includes (3m+n) pulses is transmitted from the control section 100 in synchronization with the data signal Data. Therefore, the SI shift register holds the 3m-bit print data SI, and the SP shift register holds the n-bit program data SP at the timing of the last ((3m+n)th) pulse included in the clock signal Sck.

As illustrated in FIG. 15, the ejection selection section 70 includes an SIH-1 flip-flop, an SIM-1 flip-flop, and an SIL-1 flip-flop (first data-holding section) that hold the 3-bit print data (SIH-1, SIM-1, SIL-1) (first ejecting section bit data group). The ejection selection section 70 includes an SIH-2 flip-flop, an SIM-2 flip-flop, and an SIL-2 flip-flop (second data-holding section) that hold the 3-bit print data (SIH-2, SIM-2, SIL-2) (second ejecting section bit data group). The SIH-2 flip-flop, the SIM-2 flip-flop, and the SIL-2 flip-flop are provided in the preceding stage of the SIH-1 flip-flop, the SIM-1 flip-flop, and the SIL-1 flip-flop. The data signal Data is input to the SIH-2 flip-flop, the SIM-2 flip-flop, and the SIL-2 flip-flop, and then input to the SIH1 flip-flop, the SIM-1 flip-flop, and the SIL-1 flip-flop.

As illustrated in FIG. 15, the ejection selection section 70 according to the first modification includes an n-bit SP latch that includes SP-1 to SP-n latches. The ejection selection section 70 according to the first modification includes a 3m-bit SI latch that includes an SIH-1 latch, an SIM-1 latch, an SIL-1 latch, an SIH-2 latch, an SIM-2 latch, an SIL-2 latch, . . . , an SIH-m latch, an SIM-m latch, and an SIL-m latch. The control signal LAT is input in common to the SP-1 to SP-n latches included in the SP latch, the SIH-1 latch, the SIM-1 latch, the SIL-1 latch, the SIH-2 latch, the SIM-2 latch, the SIL-2 latch, . . . , the SIH-m latch, the SIM-m latch, and the SIL-m latch included in the SI latch.

The program data SP (SP-1 to SP-n) held by (stored in) the SP shift register is input to the SP latch (SP-1 to SP-n latches) at the edge timing of the control signal LAT. Likewise, the 3m-bit print data SI (SIH-1, SIM-1, SIL-1, SIH-2, SIM-2, SIL-2, . . . , SIH-m, SIM-m, and SIL-m) held by (stored in) the SI shift register is input to the SI latch (SIH-1 latch, SIH-1 latch, SIM-1 latch, SIL-1 latch, SIH-2 latch, SIM-2 latch, SIL-2 latch, . . . , SIH-m latch, SIM-m latch, and SIL-m latch) at the edge timing of the control signal LAT.

The control section 100 transmits the pulse of the control signal LAT in each print cycle Ta in the same manner as described above. Therefore, the program data SP held by the SP latch and the print data SI held by the SI latch are updated in each print cycle Ta based on the control signal LAT. FIG. 16 illustrates the waveform of each signal supplied to the ejection selection section 70 according to the first modification from the control unit 10, and the update timing of the SP latch and the SI latch.

As illustrated in FIG. 15, the ejection selection section 70 according to the first modification includes m decoders DEC-1 to DEC-m. The control signal LAT, the control signal CH, and the program data SP-1 to SP-n held by the SP-1 to SP-n latches are input in common to the m decoders DEC-1 to DEC-m. The 3 bit print data (SIH-i, SIM-i, SIL-i) (i is 1 to m) held by the SIH-i latch, the SIM-i latch, and the SIL-i latch is input to the ith decoder DEC-i. The decoder DEC-i outputs a control signal Sa-i that controls selection/non-selection of the drive signal COM-A, a control signal Sb-i that controls selection/non-selection of the drive signal COM-B, and a control signal Sc-i that controls selection/non-selection of the drive signal COM-C, according to a predetermined decoding logic. A common decoding logic is applied to the m decoders DEC-1 to DEC-m.

The drive signal COM-A, the drive signal COM-B, or the drive signal COM-C selected by the control signal Sa-i, the control signal Sb-i, or the control signal Sc-i is output from the ejection selection section 70 as the drive signal Vout-i through transmission gates (analog switches) TGa-i, TGb-i, and TGc-i.

In FIG. 15, the SIH-1 flip-flop, the SIM-1 flip-flop, the SIL-1 flip-flop, the SIH-1 latch, the SIM-1 latch, the SIL-1 latch, and the decoder DEC-1 form a first waveform selection signal generation circuit 71-1, and the first waveform selection signal generation circuit 71-1 generates the control signals Sa-1, Sb-1, and Sc-1 (first waveform selection signal) for generating the drive signal Vout-1 based on the data signal Data (ejection selection signal). The first waveform selection signal generation circuit 71-1 includes the SIH-1 flip-flop, the SIM-1 flip-flop, and the SIL-1 flip-flop (first data-holding section), and generates the control signals Sa-1, Sb-1, and Sc-1 (first waveform selection signal) based on the 3-bit print data (SIH-1, SIM-1, SIL-1) (first ejecting section bit data group) held by the SIH-1 flip-flop, the SIM-1 flip-flop, and the SIL-1 flip-flop. The SIH-2 flip-flop, the SIM-2 flip-flop, the SIL-2 flip-flop, the SIH-2 latch, the SIM-2 latch, the SIL-2 latch, and the decoder DEC-2 form a second waveform selection signal generation circuit 71-2, and the second waveform selection signal generation circuit 71-2 generates the control signals Sa-2, Sb-2, and Sc-2 (second waveform selection signal) for generating the drive signal Vout-2 based on the data signal Data (ejection selection signal). The second waveform selection signal generation circuit 71-2 includes the SIH-2 flip-flop, the SIM-2 flip-flop, and the SIL-2 flip-flop (second data-holding section), and generates the control signals Sa-2, Sb-2, and Sc-2 (second waveform selection signal) based on the 3-bit print data (SIH-2, SIM-2, SIL-2) (second ejecting section bit data group) held by the SIH-2 flip-flop, the SIM-2 flip-flop, and the SIL-2 flip-flop. The ejection selection section 70 according to the first modification includes m waveform selection signal generation circuits 71-1 to 71-m having the same configuration.

In FIG. 15, the transmission gates TGa-1, TGb-1, and TGc-1 form a first drive signal selection circuit 72-1, and the first drive signal selection circuit 72-1 selects the waveform included in the drive signals COM-A, COM-B, and COM-C based on the control signals Sa-1, Sb-1, and Sc-1 (first waveform selection signal) to generate the drive signal Vout-1. The transmission gates TGa-2, TGb-2, and TGc-2 form a second drive signal selection circuit 72-2, and the second drive signal selection circuit 72-2 selects the waveform included in the drive signals COM-A, COM-B, and COM-C based on the control signals Sa-2, Sb-2, and Sc-2 (second waveform selection signal) to generate the drive signal Vout-2. The ejection selection section 70 according to the first modification includes m drive signal selection circuits 72-1 to 72-$m$ having the same configuration.

FIG. 17 illustrates the layout of an IC 90 that implements the ejection selection section 70 according to the first modification. The arrangement of the m waveform selection signal generation circuits 71-1 to 71-$m$ and the m drive signal selection circuits 72-1 to 72-$m$ illustrated in FIG. 17 is the same as the arrangement of the m waveform selection signal generation circuits 71-1 to 71-$m$ and the m drive signal selection circuits 72-1 to 72-$m$ illustrated in FIG. 10. The terminals T_Sck, T_Data, T_COM-A1, T_COM-B1, T_COM-C1, T_COM-A2, T_COM-B2, and T_COM-C2 are provided along the short side Y1 of the IC 90. The clock signal Sck (see FIG. 15) is input through the terminal T_Sck, and the data signal Data (see FIG. 15) is input through the terminal T_Data. The drive signal COM-A (see FIG. 15) is input through the terminals T_COM-A1 and T_COM-A2, the drive signal COM-B (see FIG. 15) is input through the terminals T_COM-B1 and T_COM-B2, and the drive signal COM-C (see FIG. 15) is input through the terminals T_COM-C1 and T_COM-C2. The drive signals COM-A, COM-B, and COM-C input through the terminals T_COM-A1, T_COM-B1, and T_COM-C1 are input to the drive signal selection circuits 72-2, . . . , and 72-$m$, and the drive signals COM-A, COM-B, and COM-C input through the terminals T_COM-A2, T_COM-B2, and T_COM-C2 are input to the drive signal selection circuits 72-1, . . . , and 72-($m$−1). Note that the terminals through which the control signals LAT and CH are input are omitted in FIG. 17.

The clock signal Sck is input first to the waveform selection signal generation circuit 71-1 among the m waveform selection signal generation circuits 71-1 to 71-$m$ that is situated closest to the short side Y1 where the clock signal Sck is input, and finally input to the waveform selection signal generation circuit 71-$m$ that is situated farthest from the short side Y1. On the other hand, the data signal Data is input first to the waveform selection signal generation circuit 71-$m$ among the m waveform selection signal generation circuits 71-1 to 71-$m$ that is situated farthest from the short side Y1 where the clock signal Sck is input, and finally input to the waveform selection signal generation circuit 71-1 that is situated closest to the short side Y1.

More specifically, the clock signal Sck is input first to the SIH-1 flip-flop (final-stage flip-flop) among the 3m flip-flops included in the SI shift register, and then sequentially input to the remaining flip-flops. On the other hand, the data signal Data is input first to the SIL-m flip-flop (first-stage flip-flop) among the 3m flip-flops included in the SI shift register, and then sequentially input to the remaining flip-flops. Specifically, since the clock signal Sck is sequentially input to two arbitrary flip-flops among the 3m flip-flops included in the SI shift register which are adjacent to each other and between which data is transferred directly so that the clock signal Sck is input to one of the two arbitrary flip-flops that transfers data after the clock signal Sck has been input to the other of the two arbitrary flip-flops to which data is transferred, it is possible to provide a sufficient hold time. Since data is necessarily transferred between two flip-flops that are adjacent to each other, only a low load is applied to the data transfer line, and it is easy to provide a setup time. Since the load applied to a data transfer line and a clock signal line between two flip-flops that are adjacent to each other changes to only a small extent even when the number m of ejecting sections 600 (number of nozzles 651) is increased in order to implement high resolution, it is possible to provide a sufficient hold time and a sufficient setup time. Therefore, the IC 90 that implements the ejection selection section 70 according to the first modification has an advantage in that a shift in data transfer timing rarely occurs, and a malfunction rarely occurs.

Note that the ejection selection section 70 according to the first modification may be configured so that the clock signal Sck is input through the terminal T_Sck provided to the short side Y2, input first to the waveform selection signal generation circuit 71-1 among the m waveform selection signal generation circuits 71-1 to 71-$m$ that is situated farthest from the short side Y2, and finally input to the waveform selection signal generation circuit 71-$m$ that is situated closest to the short side Y2 (not illustrated in the drawings). The data signal Data may be input through the terminal T_Data provided to the short side Y2 of the IC 90, input first to the waveform selection signal generation circuit 71-$m$ among the m waveform selection signal generation circuits 71-1 to 71-$m$ that is situated closest to the short side Y2, and finally input to the waveform selection signal generation circuit 71-1 that is situated farthest from the short side Y2.

<Second Modification>

Although the embodiments have been described above taking an example in which the data signal Data includes the program data SP, the program data SP may be omitted when the waveform selection logic (decoding logic applied to the decoders DEC-1 to DEC-m) applied to the drive signals COM-A and COM-B is fixed (i.e., cannot be changed).

The embodiments of the invention and the modifications thereof have been described above. Note that the invention is not limited to the above embodiments and modifications thereof. Various modifications and variations may be made without departing from the scope of the invention. For example, the above embodiments and modifications thereof may be appropriately combined.

The invention includes various other configurations substantially the same as the configurations described above in connection with the embodiments (e.g., a configuration having the same function, method, and results, or a configuration having the same objective and effects). The invention also includes a configuration in which an unsubstantial element described above in connection with the embodiments is replaced by another element. The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

REFERENCE SIGNS LIST

1: liquid ejecting device, 2: moving element, 3: moving mechanism, 4: feed mechanism, 10: control unit, 20: head unit, 24: carriage, 31: carriage motor, 32: carriage guide shaft, 33: timing belt, 35: carriage motor driver, 40: platen, 41: feed motor, 42: feed roller, 45: feed motor driver, 50-$a$, 50-$b$: driver circuit, 60: piezoelectric element, 70: ejection selection section, 71-1 to 71-$m$: waveform selection signal generation circuit, 72-1 to 72-$m$: drive signal selection circuit, 80: maintenance unit, 81: cleaning mechanism, 82: wiping mechanism, 90: integrated circuit (IC), 92: integrated circuit (IC), 100: control section, 101: ejection selection signal generation section (ejection selection signal generation circuit), 190: flexible cable, 600: ejecting section, 601: piezoelectric material, 611, 612: electrode, 621: diaphragm, 631: cavity, 632: nozzle plate, 641: reservoir, 651: nozzle

The invention claimed is:

1. A liquid ejecting device comprising:
an ejecting section group that includes a plurality of ejecting sections that can eject a liquid droplet having different sizes upon application of a drive signal, the plurality of ejecting sections including a first ejecting section and a second ejecting section; and
an ejection selection section that selects an ejecting section to which the drive signal is applied from the ejecting section group in response to an ejection selection signal,
the ejection selection signal including:
 a first ejecting section bit data group consisting of a plurality of pieces of first ejecting section control bit data including first ejecting section first control bit data and first ejecting section second control bit data that control the size of the liquid droplet to be ejected from the first ejecting section; and
 a second ejecting section bit data group consisting of a plurality of pieces of second ejecting section control bit data including second ejecting section first control bit data and second ejecting section second control bit data that control the size of the liquid droplet to be ejected from the second ejecting section, and
the second ejecting section bit data group following the first ejecting section bit data group.

2. The liquid ejecting device according to claim 1,
the ejection selection section being an integrated circuit,
the integrated circuit having a long side and a short side in a plan view,
the ejection selection signal being input through a terminal that is provided to the short side of the integrated circuit, and
the drive signal being output through a plurality of terminals that are provided to the long side of the integrated circuit.

3. The liquid ejecting device according to claim 1,
the ejection selection section including:
 a plurality of waveform selection signal generation circuits that generate waveform selection signals in response to the ejection selection signal; and
 a plurality of drive signal selection circuits that select a waveform included in the drive signal in response to the waveform selection signal, and apply the selected waveform to the ejecting section, and
 the plurality of waveform selection signal generation circuits being arranged in a direction along the long side of the integrated circuit in a plan view.

4. The liquid ejecting device according to claim 3,
the ejection selection signal being sequentially transferred to the plurality of waveform selection signal generation circuits by means of a clock signal, and
the clock signal being input through a terminal that is provided to the short side of the integrated circuit in a plan view.

5. The liquid ejecting device according to claim 4,
the clock signal being input first to a waveform selection signal generation circuit among the plurality of waveform selection signal generation circuits that is situated closest to the short side where the clock signal is input, and
the ejection selection signal being finally input to a waveform selection signal generation circuit among the plurality of waveform selection signal generation circuits that is situated closest to the short side where the clock signal is input.

6. The liquid ejecting device according to claim 4,
the ejection selection signal being input first to a waveform selection signal generation circuit among the plurality of waveform selection signal generation circuits that is situated closest to the short side where the clock signal is input, and
the clock signal being finally input to a waveform selection signal generation circuit among the plurality of waveform selection signal generation circuits that is situated closest to the short side where the clock signal is input.

7. The liquid ejecting device as according to claim 1,
the ejection selection section including:
 a first data-holding section that holds the first ejecting section bit data group; and
 a second data-holding section that is provided in a preceding stage of the first data-holding section, and holds the second ejecting section bit data group, and
 the ejection selection signal being input to the second data-holding section, and then input to the first data-holding section.

8. The liquid ejecting device according to claim 7,
the plurality of waveform selection signal generation circuits including:
 a first waveform selection signal generation circuit that generates a first waveform selection signal among the waveform selection signals for generating the drive signal that is applied to the first ejecting section; and
 a second waveform selection signal generation circuit that generates a second waveform selection signal among the waveform selection signals for generating the drive signal that is applied to the second ejecting section,
 the first waveform selection signal generation circuit including the first data-holding section, and generating the first waveform selection signal based on the first ejecting section bit data group that is held by the first data-holding section, and
 the second waveform selection signal generation circuit including the second data-holding section, and generating the second waveform selection signal based on the second ejecting section bit data group that is held by the second data-holding section.

9. An ejection selection signal generation circuit that generates an ejection selection signal that controls a head unit, the head unit including an ejecting section group that includes a plurality of ejecting sections that can eject a liquid droplet having different sizes upon application of a drive signal, and include a first ejecting section and a second ejecting section, and the head unit also including an ejection selection section that selects an ejecting section to which the drive signal is applied from the ejecting section group,
the generated ejection selection signal including:
 a first ejecting section bit data group consisting of a plurality of pieces of first ejecting section control bit data including first ejecting section first control bit data and first ejecting section second control bit data that control the size of the liquid droplet to be ejected from the first ejecting section; and a second ejecting section bit data group consisting of a plurality of pieces of second ejecting section control bit data including second ejecting section first control bit data and second ejecting section second control bit data that control the size of the liquid droplet to be ejected from the second ejecting section, and the second ejecting section bit data group following the first ejecting section bit data group.

10. The ejection selection signal generation circuit according to claim 9, the ejection selection section being an integrated circuit, the integrated circuit having a long side and a short side in a plan view, the ejection selection signal being input through a terminal that is provided to the short side of the integrated circuit, and the drive signal being output through a plurality of terminals that are provided to the long side of the integrated circuit.

11. The ejection selection signal generation circuit according to claim 9, the ejection selection section including:

a plurality of waveform selection signal generation circuits that generate waveform selection signals in response to the ejection selection signal; and a plurality of drive signal selection circuits that select a waveform included in the drive signal in response to the waveform selection signal, and apply the selected waveform to the ejecting section, and the plurality of waveform selection signal generation circuits being arranged in a direction along the long side of the integrated circuit in a plan view.

12. The ejection selection signal generation circuit according to claim 11, the ejection selection signal being sequentially transferred to the plurality of waveform selection signal generation circuits by means of a clock signal, and the clock signal being input through a terminal that is provided to the short side of the integrated circuit in a plan view.

13. The ejection selection signal generation circuit according to claim 12, the clock signal being input first to a waveform selection signal generation circuit among the plurality of waveform selection signal generation circuits that is situated closest to the short side where the clock signal is input, and the ejection selection signal being finally input to a waveform selection signal generation circuit among the plurality of waveform selection signal generation circuits that is situated closest to the short side where the clock signal is input.

14. The ejection selection signal generation circuit according to claim 12, the ejection selection signal being input first to a waveform selection signal generation circuit among the plurality of waveform selection signal generation circuits that is situated closest to the short side where the clock signal is input, and the clock signal being finally input to a waveform selection signal generation circuit among the plurality of waveform selection signal generation circuits that is situated closest to the short side where the clock signal is input.

15. The ejection selection signal generation circuit according to claim 9, the ejection selection section including:

a first data-holding section that holds the first ejecting section bit data group; and a second data-holding section that is provided in a preceding stage of the first data-holding section, and holds the second ejecting section bit data group, and the ejection selection signal being input to the second data-holding section, and then input to the first data-holding section.

16. The ejection selection signal generation circuit according to claim 15, the plurality of waveform selection signal generation circuits including:

a first waveform selection signal generation circuit that generates a first waveform selection signal among the waveform selection signals for generating the drive signal that is applied to the first ejecting section; and a second waveform selection signal generation circuit that generates a second waveform selection signal among the waveform selection signals for generating the drive signal that is applied to the second ejecting section, the first waveform selection signal generation circuit including the first data-holding section, and generating the first waveform selection signal based on the first ejecting section bit data group that is held by the first data-holding section, and the second waveform selection signal generation circuit including the second data-holding section, and generating the second waveform selection signal based on the second ejecting section bit data group that is held by the second data-holding section.

* * * * *